US011835345B2

(12) United States Patent
Vaughn et al.

(10) Patent No.: US 11,835,345 B2
(45) Date of Patent: Dec. 5, 2023

(54) TRANSPORTATION VEHICLE ROUTING

(71) Applicant: KYNDRYL, INC., New York, NY (US)

(72) Inventors: Garfield W. Vaughn, Southbury, CT (US); Yahi Chemlal, Brno (CZ); Syed Wahid, Brno (CZ); Aaron K. Baughman, Research Triangle Park, NC (US)

(73) Assignee: KYNDRYL, INC., New York, NY (US)

( * ) Notice: Subject to any disclaimer, the term of this patent is extended or adjusted under 35 U.S.C. 154(b) by 854 days.

(21) Appl. No.: 16/454,892

(22) Filed: Jun. 27, 2019

(65) Prior Publication Data
US 2020/0408546 A1 Dec. 31, 2020

(51) Int. Cl.
*G01C 21/34* (2006.01)
*H04W 4/029* (2018.01)
*G01C 21/36* (2006.01)

(52) U.S. Cl.
CPC ..... *G01C 21/3423* (2013.01); *G01C 21/3484* (2013.01); *H04W 4/029* (2018.02); *G01C 21/3685* (2013.01)

(58) Field of Classification Search
CPC ........... G01C 21/3423; G01C 21/3484; G01C 21/3685; G01C 21/3492; H02W 4/029
See application file for complete search history.

(56) References Cited

U.S. PATENT DOCUMENTS

| 2,598,750 | A | 6/1952 | Bargehr |
| 5,910,782 | A | 6/1999 | Schmitt et al. |
| 6,477,462 | B1 * | 11/2002 | Rychlak ............. G01C 21/3423 |
| | | | 701/410 |
| 8,855,895 | B2 * | 10/2014 | Gerhardt ................... B60P 3/07 |
| | | | 701/123 |
| 8,983,649 | B2 | 3/2015 | Checketts et al. |
| 2006/0184314 | A1 * | 8/2006 | Couckuyt .......... G01C 21/3423 |
| | | | 340/995.19 |
| 2010/0302067 | A1 | 12/2010 | Goldman |
| 2015/0213715 | A1 | 7/2015 | Schulz |
| 2015/0279210 | A1 | 10/2015 | Zafiroglu |
| 2016/0063862 | A1 | 3/2016 | Itamar |

(Continued)

OTHER PUBLICATIONS

P. Mell, et al. "*The NIST Definition of Cloud Computing*", NIST Special Publication 800-145, Sep. 2011, Gaithersburg, MD.

(Continued)

*Primary Examiner* — Jess Whittington
(74) *Attorney, Agent, or Firm* — Erik Swanson; Andrew M. Calderon; Calderon Safran & Cole P.C.

(57) ABSTRACT

Methods, computer program products, and systems are presented. The method computer program products, and systems can include, for instance: determining a current transportation mode of a user with use of data of a user passenger vehicle associated to the user and data of a user auxiliary passenger vehicle associated to the user, wherein the user passenger vehicle is capable of carrying the user auxiliary vehicle, and wherein the user auxiliary vehicle is configured to be hand carried by the user; evaluating a current route of the user in dependence on the current transportation mode of the user as determined by the determining; and providing one or more output in dependence on the evaluating.

17 Claims, 15 Drawing Sheets

(56) References Cited

U.S. PATENT DOCUMENTS

| | | | |
|---|---|---|---|
| 2016/0250926 A1* | 9/2016 | Gerhardt | G07C 5/085 |
| | | | 701/22 |
| 2016/0334235 A1* | 11/2016 | Gustafson | G01C 21/3492 |
| 2017/0017848 A1 | 1/2017 | Gupta | |
| 2017/0212511 A1 | 7/2017 | Celestino | |
| 2017/0255966 A1* | 9/2017 | Khoury | B60W 40/00 |
| 2017/0287330 A1 | 10/2017 | Tsyrklevich | |
| 2017/0329341 A1 | 11/2017 | Rakshit | |
| 2018/0231386 A1* | 8/2018 | Bellotti | G01C 21/3484 |
| 2018/0275661 A1* | 9/2018 | Glaser | G01C 21/3423 |

OTHER PUBLICATIONS

Anonymous, "*Premium Services Offering for use with Driverless Vehicle Parking Optimization*" ip.com, IPCOM000245253D, Feb. 22, 2016.

\* cited by examiner

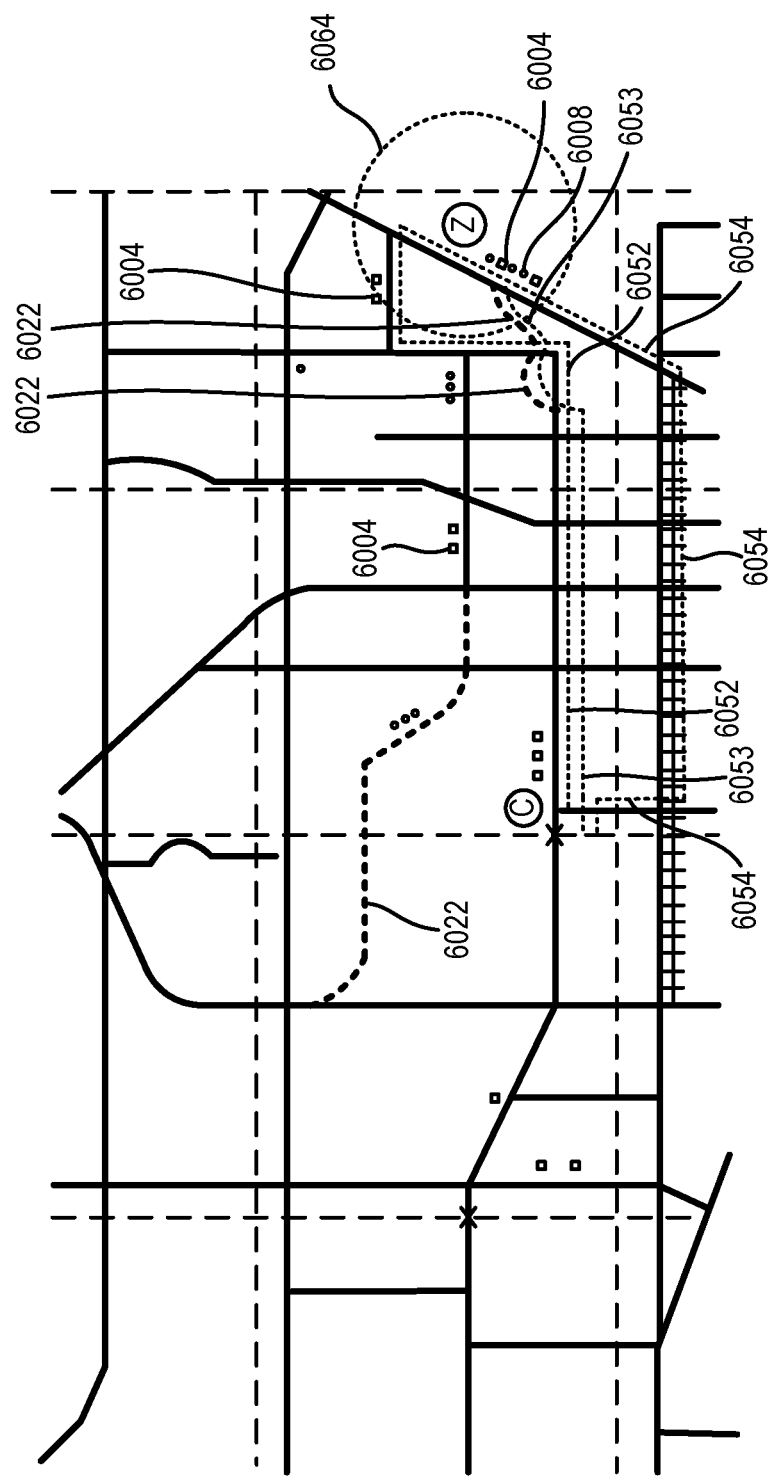

TRANSPORTATION VEHICLE ROUTING

BACKGROUND

Location based services (LBS) are software services that use location data to control functionality of computer systems LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: determining a current transportation mode of a user with use of data of a user passenger vehicle associated to the user and data of a user auxiliary passenger vehicle associated to the user, wherein the user passenger vehicle is capable of carrying the user auxiliary vehicle, and wherein the user auxiliary vehicle is configured to be hand carried by the user; evaluating a current route of the user in dependence on the current transportation mode of the user as determined by the determining; and providing one or more output in dependence on the evaluating.

In another aspect, a computer program product can be provided. The computer program product can include a computer readable storage medium readable by one or more processing circuit and storing instructions for execution by one or more processor for performing a method. The method can include, for example: determining a current transportation mode of a user with use of data of a user passenger vehicle associated to the user and data of a user auxiliary passenger vehicle associated to the user, wherein the user passenger vehicle is capable of carrying the user auxiliary vehicle, and wherein the user auxiliary vehicle is configured to be hand carried by the user; evaluating a current route of the user in dependence on the current transportation mode of the user as determined by the determining; and providing one or more output in dependence on the evaluating.

In a further aspect, a system can be provided. The system can include, for example a memory. In addition, the system can include one or more processor in communication with the memory. Further, the system can include program instructions executable by the one or more processor via the memory to perform a method. The method can include, for example: determining a current transportation mode of a user with use of data of a user passenger vehicle associated to the user and data of a user auxiliary passenger vehicle associated to the user, wherein the user passenger vehicle is capable of carrying the user auxiliary vehicle, and wherein the user auxiliary vehicle is configured to be hand carried by the user; evaluating a current route of the user in dependence on the current transportation mode of the user as determined by the determining; and providing one or more output in dependence on the evaluating.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6C is an exploded view highlighting portion of the geospatial map of FIG. 6A depicting features in relation to iteratively updating a current route of a user when traveling in a user auxiliary vehicle transportation mode according to one embodiment;

DETAILED DESCRIPTION

Figure 1:
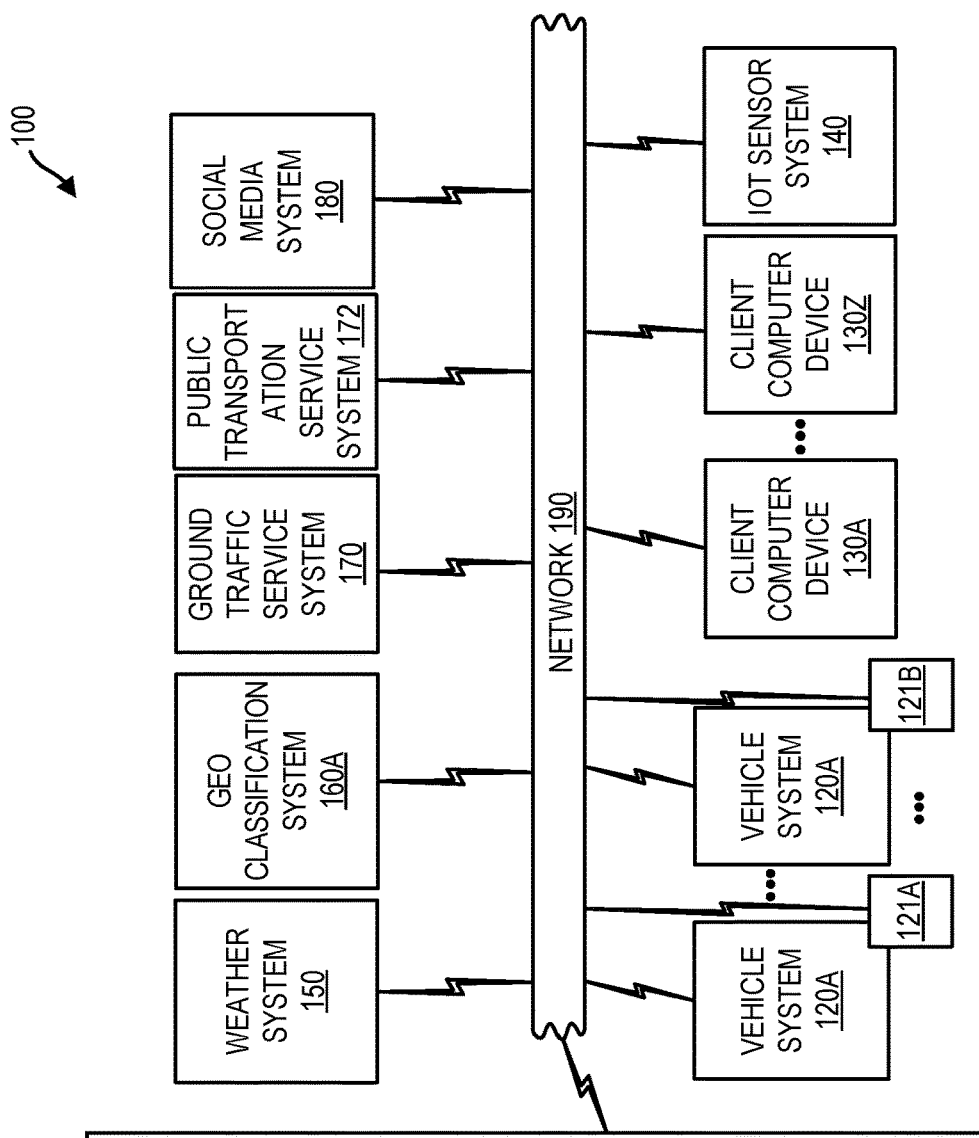
FIG. 1 is a block diagram of a system having a manager system, vehicle systems, associated user auxiliary vehicle systems, client computer devices, an IoT sensor system, a weather system, a geo classification system, a ground traffic surface system, a public transportation service system and a social media system according one embodiment.

System 100 for determining and implementing transportation vehicle routes is shown in FIG. 1. System 100 can include manager system 110, having associated data repository 108, vehicle systems 120A-120Z, user auxiliary vehicle systems 121A-121Z client computer devices 130A-130Z, IoT sensor system 140, weather service system 150, geo classification system 160, ground traffic services system 170, public transportation service system 172, and social media system 180. Manager system 110, vehicle systems 120A-120Z, user auxiliary vehicle systems 121A-121Z, client computer devices 130A-130Z, IoT sensor system 140, geo weather service system 150, classification system 160, ground traffic services system 170, public transportation service system 172, and social media system 180 can be computing node based systems and devices in communication with one another via network 190. Network 190 can be a physical network and/or virtual network. A physical network can include for example a physical telecommunications network connecting numerous computing nodes such as computer servers and computer clients. A virtual network can, for example, combine numerous physical networks, or parts thereof into a logical virtual network. In another example, numerous virtual networks can be defined over a single physical network.

According to one embodiment, manager system 110 can be external to vehicle systems 120A-120Z, user auxiliary vehicle systems 121A-121Z, client computer devices 130A-130Z, IoT sensor system 140, weather service system 150, geo classification system 160, ground traffic service system 170, public transportation service system 172, and social media system 180. According to one embodiment, manager system 110 can be co-located with one or more vehicle systems 120A-120Z, user auxiliary vehicle systems 121A-121Z, client computer devices 130A-130Z, IoT sensor system 140, geo classification system 160, ground traffic service system 170, weather service system 150, public transportation service system 172, and social media system 180.

Vehicles systems 120A-120Z can be of and physically affixed to respective vehicles such as user passenger vehicles as may be provided by e.g. cars and trucks. User auxiliary vehicle systems 121A-121Z can be of and physically affixed to user auxiliary vehicles. User auxiliary vehicles herein can be personal vehicles that can be motorized or unmotorized. Examples of a motorized transportation vehicle can be a motorized scooter. An example of an unmotorized personal transportation vehicle can be a bicycle. User auxiliary vehicles associated to respective vehicle systems 120A-120Z can be configured to be hand-carried by a user. In another aspect a user passenger vehicle herein can be configured to carry a user auxiliary vehicle such as a personal vehicle. For example, the vehicle can be configured to carry a user auxiliary vehicle, e.g., by carrying the user auxiliary vehicle in a trunk thereof, cabin thereof, storage thereof, or flatbed thereof in the case of a truck. A vehicle can be configured to carry a user auxiliary vehicle also or alternatively by way of a rack onto which the user auxiliary vehicle can be removably attached by manual action of a user.

Each of the different client computer devices 130A-130Z can be associated to a different user. Regarding one or more client computer device 130A-130Z, a computer device of one or more client computer device 130A-130Z in one embodiment can be a computing node device provided by a client computer, e.g. a mobile device, e.g. a smartphone or tablet, a laptop, smartwatch that runs one or more program, e.g. including a web browser for opening and viewing web pages. In some embodiments, client computer devices of client computer devices 130A-130Z can include biometric sensors for output of biometric sensor data. Manager system 110 can receive biometric data output by such a biometric sensor.

IoT sensor system 140, according to one embodiment, can include a plurality of cameras disposed about a spatial geometrical area supported by system 100. According to one embodiment, the cameras of IoT sensor system 140 can be configured to provide image data which can be processed to determine whether a parking spot is open or occupied. In one embodiment, manager system 110 running image recognition process to examine spatial image data representing a feature of interest (e.g. a parking spot available or closed status) can include manager system 110 employing pattern recognition processing using one or more of e.g. feature extraction algorithms, classification algorithms, and/or clustering algorithms. In one embodiment, manager system 110 running an image recognition process can include performing of digital image processing. Digital image processing can include, e.g., filtering, edge detection, shape classification, optical character recognition (OCR), and/or encoded information decoding.

Geo classification system 160 can associate venues to spatial coordinate ranges associated to the venues. Geo classification system 160 can include enhanced spatial maps pre-marked with tags to indicate uses associated with map features. Map features can include venues having associated venue areas including venue building areas and/or associated venue parking areas. An enhanced map can include tag specifying usage classifications of venues, e.g. residential, business, public and the like. An enhanced map can be tagged to tag features of a map including e.g. roads, bodies of water and infrastructure features such as building walls (exterior and interior) defining enterprise venues. In some cases, an enhanced map can be tagged so that that different parts of a building are tagged differently, e.g. a doorway can be tagged differently from a conference room. Geo classification system 160 can provide data tags associated to locations that specify uses associated with various locations. Geo classification system 160 can cognitively map venues identified by venue identifiers, e.g. names, addresses, classifications, and the like, to coordinate location ranges associated to the various venues. Accordingly, manager system 110 querying geo classification system 160, with location data in the form of coordinate location data, can return an identifier venue. Further, geo classification system 160 can cognitively map venues that are listed in geo-classification system with uses associated with such venues, e.g. whether such venues are for residential use or business use and include a variety of additional or alternative use classifications, e.g. public use, roadway use, waterway use, and the like. An enhanced map can be tagged to tag features of a map, including e.g. roads, bodies of water and venues. Venues can be provided e.g. by open spaces, such as developed open spaces or undeveloped open spaces, buildings such as open roof building or closed roof buildings, and/or open spaces associated to buildings, such as building associated with a parking lot. For each venue, geo classification system 160 can associate e.g. identifiers for the venue, ranges and coordinate locations associated with the venue, features associated to the venue, such as building infrastructure features, parking lot features, and other features. Geo classification system 160 according to one embodiment can be provided by GOOGLE MAPS® (GOOGLE MAPS® is a registered trademark of Google, Inc.).

Weather service system 150 can be configured to provide weather data with respect to an area being serviced by system 100. Weather data can include e.g. historical temperature data, precipitation data, wind data and weather event data. Weather data can include e.g. current temperature data, precipitation data, wind data and weather event data. Weather data can include e.g. forecast temperature data, precipitation data, wind data and weather event data. Weather events can include e.g. storms including hurricanes, tornados, fog formations, heat waves and cold waves. Weather service system 150 can store weather data associated to different subareas of an area being serviced by system 100.

Ground traffic services system 170 can be configured to provide alternate candidate vehicle driving routes between first and second locations. Ground traffic services system 170 can be configured to provide a selected optimum driving route between first and second locations. Ground traffic services system 170 can be configured to provide data on traffic conditions such as current traffic conditions over a geospatial area. Ground traffic services system 170, according one embodiment can be collocated with geo classification system 160.

Public transportation service system 172 can provide data on schedules for public transportation, e.g., trains, buses, and the like. Public transportation service system 172 can provide real-time data that is updated based on real-time changes from publicly published schedules for arrival times and departure times.

Social media system 180 can include a collection of files, including for example, HTML files, CSS files, image files, and JavaScript files. Social media system 180 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment. During a process of registration wherein a user of system 100 registers as a registered user of system 100, a user sending registration data can send with permission data defining the registration data a permission that grants access by manager system 110 to data of the user within social media system 180. On being registered, manager system 110 can examine data of social media system 180 e.g. to determine whether first and second users are in communication with one another via a messaging system of social media system 180. A user can enter registration data using a user interface displayed on a client computer device of client computer devices 130A-130Z. Entered registration data can include e.g. name, address, social media account information, other contact information, biographical information, background information, preferences information, and/or permissions data e.g. can include permissions data allowing manager system 110 to query data of a social media account of a user provided by social media system 180 including messaging system data and any other data of the user. When a user opts-in to register into system 100 and grants system 100 permission to access data of social media system 180, system 100 can inform the user as to what data is collected and why, that any collected personal data may be encrypted, that the user can opt out at any time, and that if the user opts out, any personal data of the user is deleted.

Data repository 108 in roadmaps area 2121 can store data on user passenger vehicle roads traversable within the geospatial area serviced by system 100. Roadmaps area 2121 can include such data as geospatial coordinates defining a roadway, as well as other data tags such as road maintenance data, road attributes e.g. shoulder, no shoulder, associated guardrail, associated act accident records, and the like.

Data repository 108 in trail maps area 2122 can store data on trails that are accessible by user auxiliary vehicles such as personal vehicles that are not accessible by user passenger vehicles. Roadmaps area 2121 can store data on roads accessible by user passenger vehicles and trail maps area 2122 can store data on trails accessible by user auxiliary vehicles but not accessible by user passenger vehicles. Manager system 110 can be configured to build up data of trail maps area 2122 heuristically over time by examining historical routes of users over time who are traveling by riding of personal vehicles through a geospatial area being serviced by system 100. Manager system 110, for example, can be configured to log into trail maps area 2122, a new trail after observing a new trail for certain personal vehicle type. After examining path data of user auxiliary vehicles for certain type indicates that a certain path has been used as a trail more than N times by users of system 100 riding in certainly classified vehicle type.

Data repository 108 in users area 2123 can store data on users of system 100. Users of system 100 can be registered users of system 100. On receipt of registration data from a user manager system 110 can establish a Universally Unique Identifier (UUID) for the user and can store a record for that user into users area 2123. Manager system 110 can be configured so that on registration more than one vehicle can be associated to a user in response to user defined registration data. For example, on registration, a user can define data specifying that a certain vehicle provided by user passenger vehicle is associated to the user. A user on registration can also specify that a certain user auxiliary vehicle is associated to the user. Therefore, on such a registration the vehicle and the user auxiliary vehicle associated with the user can be associated to each other by having a commonly associated user. Within users area 2123, there can be stored for a given user, e.g., a UUID and identifiers for user passenger vehicles and user auxiliary vehicles associated to such users.

Data repository 108 in vehicles area 2124 can store data on user passenger vehicles supported by system 100. In vehicles area 2124, data repository 108 can store data on user passenger vehicles such as cars and trucks that are associated to respective users of system 100.

Data repository 108 in user auxiliary vehicles area 2125 can store data on user auxiliary vehicles supported by system 100. In user auxiliary vehicles area 2125 data repository 108 can store data, e.g. respecting motorized and unmotorized human powered personal vehicles that are associated respective users of system 100. Motorized vehicles supported by system 100 can include e.g. motorized scooters, motorized sleds. Unmotorized vehicles that can be supported by system 100 can include e.g. bicycles.

Data repository of 108 in routes history area 2126 can store data on historical routes traveled by vehicles supported by system 100. Data repository 108 in routes history area 2126 can store data on historical routes traveled by user passenger vehicles as well as user auxiliary vehicles supported by system 100. The route data stored in routes history area 2126 can be broken on down into route segments.

Data repository 108 in user passenger vehicle parking area 2127 can store data on user passenger vehicle parking spaces over the geospatial area supported by system 100. Manager system 110 can assign the UUID to each user passenger vehicle parking system recognized in a geospatial area being serviced by system 100. Within vehicle parking area 2127 there can be stored data specifying historical parking space occupied times and parking space open times for respective user passenger vehicle parking spaces recognized by system 100.

Data repository 108 in user auxiliary vehicle parking area 2128 can store data on parking areas for user auxiliary vehicles e.g. motorized or unmotorized personal vehicles. Data repository 108 and user auxiliary vehicle parking area 2128 can store data that specifies parking space open and parking space occupied periods for respective auxiliary parking spaces supported by system 100 over time. The user auxiliary vehicle parking spaces specified user auxiliary vehicle parking area 2128 can include tags specifying user auxiliary vehicle type, e.g., motorized scooter, motorized sled, human powered bicycle, and the like. Embodiments herein recognize that some user auxiliary vehicle types can be compact enough so as not to require an associated parking space e.g. can be hand carried by a user, perhaps folded, in some embodiments into a building associated to the final destination e.g. a retail store, office building, recreation venue, and the like.

Data repository 108 in decision data area can store various decision data structure and predictive models for use in return of action decision. Decision data structures can include e.g. decision tables and decision. Predictive models can include predictive models trained by machine learning processes using historical data collected within data repository 108.

Manager system 110 can run various processes. Manager system 110 running preparation and maintenance process 111 can prepare data for storage into storage into various areas 2121-2129 of data repository 108 and can store and maintain data in the various areas 2121-2129 of data repository 108. Manager system 110 running preparation maintenance process 111 can run various processes to innovatively query various data sources for return data. The various data sources can include e.g. vehicle systems 120A-120Z, user auxiliary vehicle systems 121A-121Z, client computer devices 130A-130Z, IoT sensor system 140, weather system 150, geo spatial system 160, ground traffic services system 170, public transportation service system 172, and social media system 180. Manager system 110 running preparation and maintenance process 111 can include manager system 110 running various processes to structuralized unstructured data into structured form prior to storage into one or more area of areas 2121-2129 of data repository 108.

Manager system 110 running traveling mode detection process 112 can include manager system 110 detecting current mode of transportation of a user. Manager system 110 running traveling mode detection process 112 can store path data, i.e. location over time data of (a) user passenger vehicle and (b) a user auxiliary vehicle of a user over time. Manager system 110 on determining based on the examining that the user passenger vehicle and the user auxiliary vehicle are moving together over time can determine that the user is traveling in a user passenger vehicle traveling mode. Manager system 110, based on a determining that a user passenger vehicle of the user is parked, and a user auxiliary vehicle of the user is moving, can determine that the user is currently moving in a user auxiliary vehicle transportation mode.

Manager system 110 running transportation route determination process 113 can include manager system 110 determining a current route for a current trip. Manager system 110 miming transportation route determination process 113 can include manager system 110 iteratively updating a current route for a current trip. Manager system 110 running transportation route determination process 113 can include manager system 110 in some cases determining that an optimal route for a current trip is a multimode transportation route that comprises more than one transportation mode, e.g., a first transportation mode provided by a user passenger vehicle transportation mode and a second transportation mode provided by a user auxiliary vehicle transportation mode.

Manager system 110 running transportation route determination process 113 can examine data of geospatial regions which can be referred to as cells, and for selected cells can evaluate a predicted performance of a user passenger vehicle mode and a predicted performance of a user auxiliary vehicle transportation mode. On the determination that one or more destination cell of the current route has a predicted user auxiliary vehicle transportation mode performance that exceeds predicted performance for a user passenger vehicle transportation mode manager system 110 can establish a multimode transportation route as the current route for a current trip.

Manager system 110 running route evaluation process 114 can evaluate different candidate routes, such as different user auxiliary vehicle transportation routes. Manager system 110 running route evaluation process 114 can include manager system 110 applying a multi-factor criterion for evaluation. The multiple factors can include e.g. a destination time factor, a comfort factor, a physical exhaustion factor (e.g. in the case of a human powered user auxiliary vehicle), and a current route factor (e.g. so that a current route is given priority over a new route).

Manager system 110 can run NLP process 113 to process data for preparation of records that are stored in data repository 108 and for other purposes. Manager system 110 can run a Natural Language Processing (NLP) process 115 for determining one or more NLP output parameter of a message. NLP process 115 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 115 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 running NLP process 115 can include manager system 110 returning NLP output parameters in addition to those specification topic and sentiment, e.g. can provide sentence segmentation tags, and part of speech tags. Manager system 110 can use sentence segmentation parameters to determine e.g. that an action topic and an entity topic are referenced in a common sentence for example.

Figure 2:
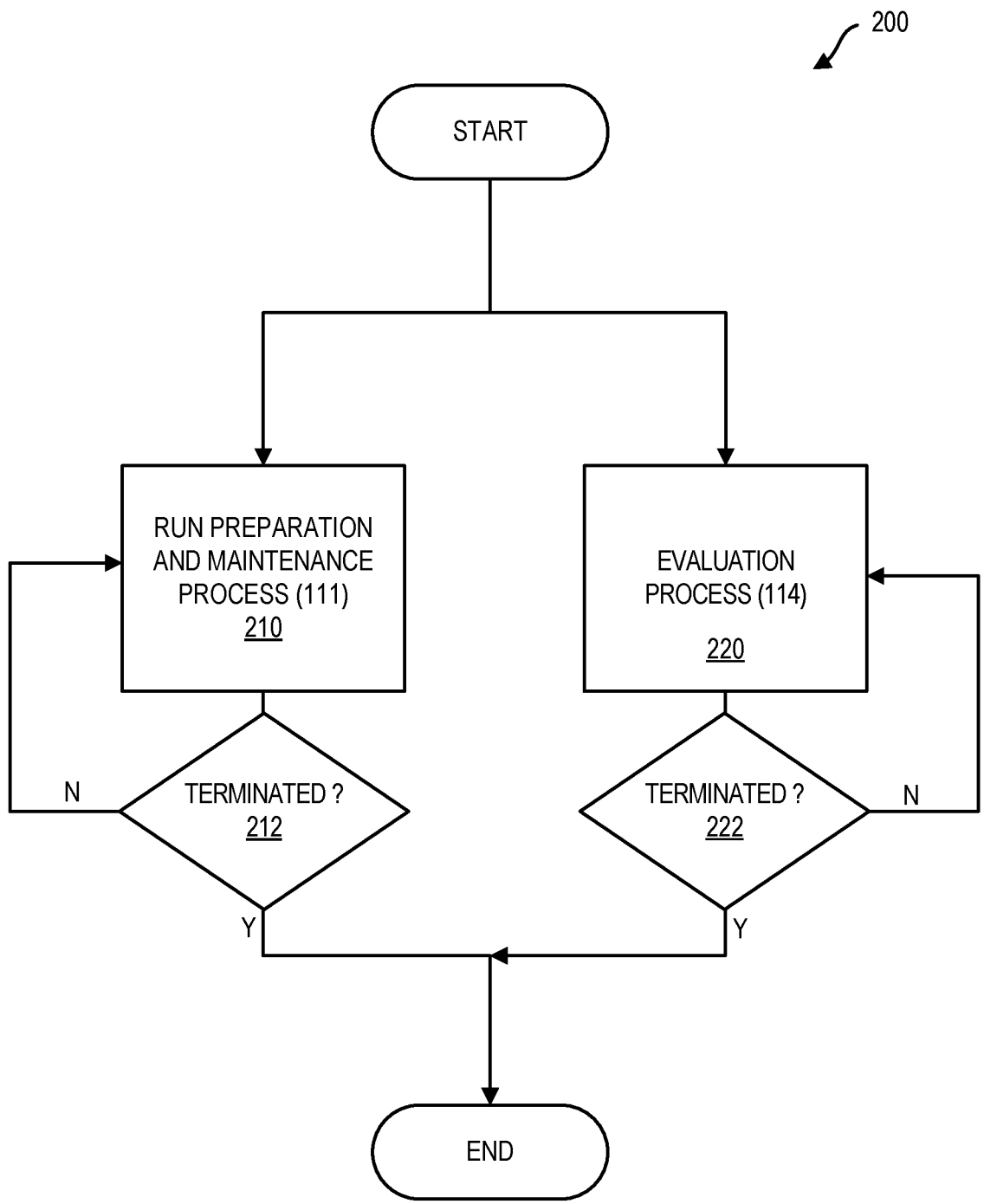
FIG. 2 is a flowchart illustrating performance of a method by a manager system according to one embodiment.

The flowchart of FIG. 2 illustrates a process for performance by manager system 110 associated to an enterprise, such as an online retailer. FIG. 2 is a flowchart illustrating coordination of processes that can be performed by manager system 110 of FIG. 1 in accordance with one or more embodiment set forth herein.

At block 210, manager system 110 can run preparation and maintenance process 111 to populate prepare and maintain various data of data repository 108 including data of areas 2121-2129. Manager system 110 can run preparation and maintenance process 111 iteratively until process 111 is terminated at block 212.

At block 220, Manager system 110 can run route evaluation process 114. For support of running of route evaluation process 114 iteratively, manager system 110 can be running e.g. mode detection process 112, multimode transportation route determination process 113, and/or NLP process 115. Manager system 110 can run route evaluation process 114 until route evaluation process 114 is terminated at block 222. Manager system 110 can run preparation and maintenance process 111 and route evaluation process 114 concurrently and can run each of process 111 and process 114 iteratively.

Figure 3:
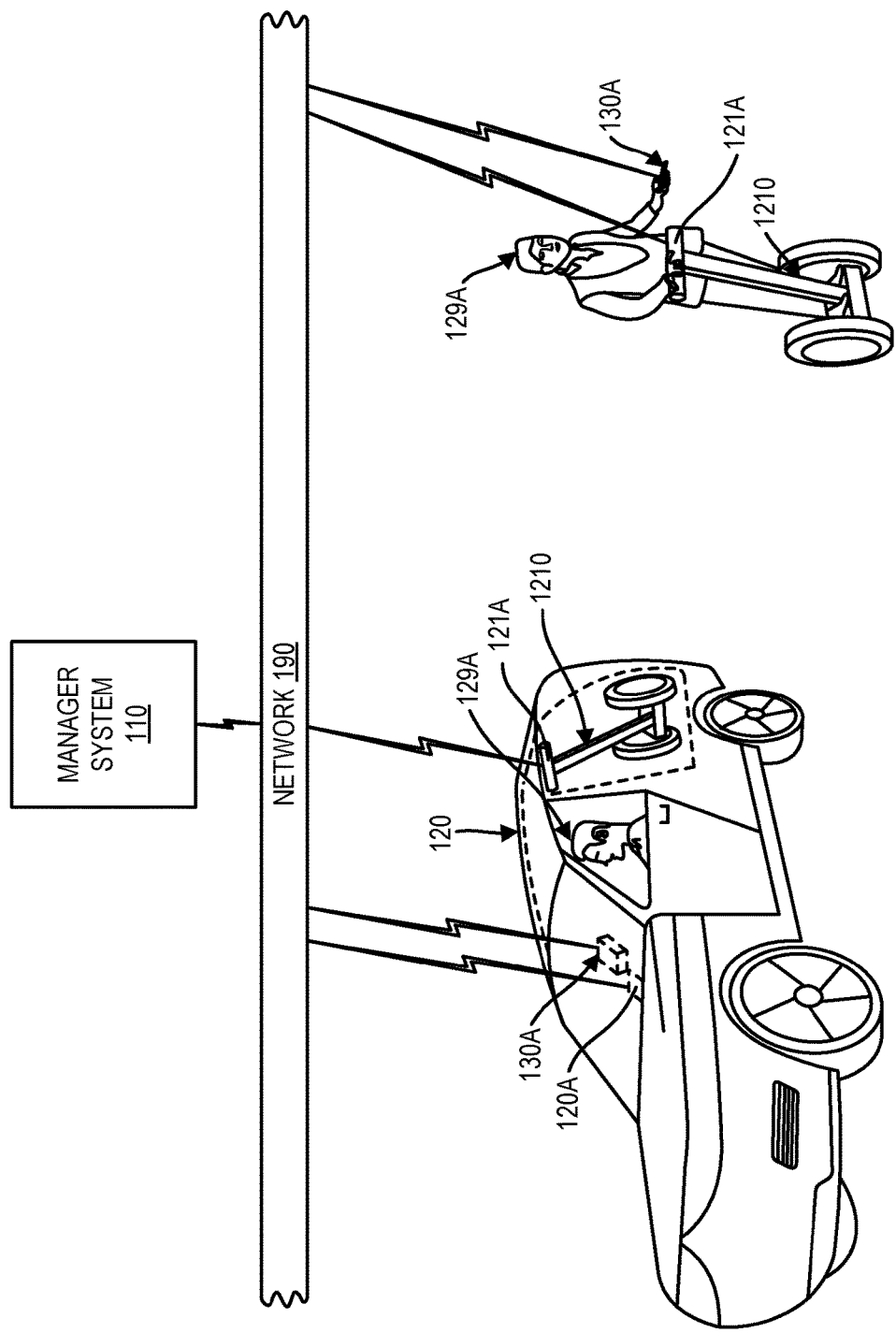
FIG. 3 is a schematic block diagram depicting physical attributes of a system having a manager system, a vehicle system, a user auxiliary vehicle system, and a client computer device according to one embodiment.

A physical schematic view of system 100 is shown in FIG. 3. The left side of FIG. 3 depicts a user passenger vehicle transportation mode in which user 129A travels within vehicle 1200 provided by a user passenger vehicle in a user passenger vehicle transportation mode. The right hand side of FIG. 3 depicts an auxiliary transportation mode in which user 129A travels on user auxiliary vehicle 1210 in a user auxiliary vehicle transportation mode. In FIG. 3 user auxiliary vehicle 1210 as shown as being provided by a motorized scooter and another use case user auxiliary vehicle 1210 can be provided by another form of motorized personal vehicle. In one embodiment, user auxiliary vehicle 1210 can be provided by manually powered personal vehicle such as a bicycle. In the embodiment of FIG. 3. The auxiliary transportation mode 1210 is shown as being provided by an auxiliary transportation mode in which user 129A rides on a personal vehicle. In another example of an auxiliary transportation mode user 129A which can be referred to as a public vehicle transportation mode user 129A can travel on a public transportation vehicle, e.g. a publicly available train or bus.

Manager system 110 running transportation mode detection process 112 can detect current mode of transportation of a user. Manager system 110 can be iteratively obtaining location data of vehicle system 120A which can be physically affixed to vehicle 1200 provided by user passenger vehicle, user auxiliary vehicle system 121A which can be physically affixed to user auxiliary vehicle 1210 (e.g. disposed in a handle console as shown) and client computer system 130A can be substantially continually physically associated to user 129, at all times. According to one embodiment, vehicle system 120A, user auxiliary vehicle system 121A, and client computer device 130A can have incorporated therein a respective GPS sensor that senses and processes radiofrequency signals from orbiting satellites and based on the processing of such signals can report current coordinate location of the respective vehicle system 120A, user auxiliary vehicle system 121A, or client computer device 130A.

System 100 can be configured alternatively or additionally so that manager system 110 iteratively receives location data of vehicle system 120A, user auxiliary vehicle system 121A, and/or client computer device 130A from a locating service that provides location data of vehicle system 120A, user auxiliary vehicle system 121A, and client computer device 130A by processing radiofrequency signals received from e.g. cellular service and/or wireless LAN e.g. Wi-Fi networks. Location data of vehicle system 120A, user auxiliary vehicle system 121A, and client computer device 130A collected over time into data repository 108 defines path data. Manager system 110 running transportation mode detection process 112 can determine the current transportation mode of user 129A by way of examining path data. Where vehicle system 120A and user auxiliary vehicle system 121A travel together manager system 110 can determine that user 129A is traveling in a user passenger vehicle transportation mode. Where user auxiliary vehicle system 121A is traveling along a path and vehicle system 120A is not moving manager system 110 can determine that user 129A is traveling in a user auxiliary vehicle transportation mode, i.e. is being transported by user auxiliary vehicle 1210. Manager system 110 can store path data for user passenger vehicles in vehicles area 2124, can store path data for user auxiliary vehicles into auxiliary vehicles area 2125, and can store path data for client computer devices (users) into users area 2123.

Figure 4A:
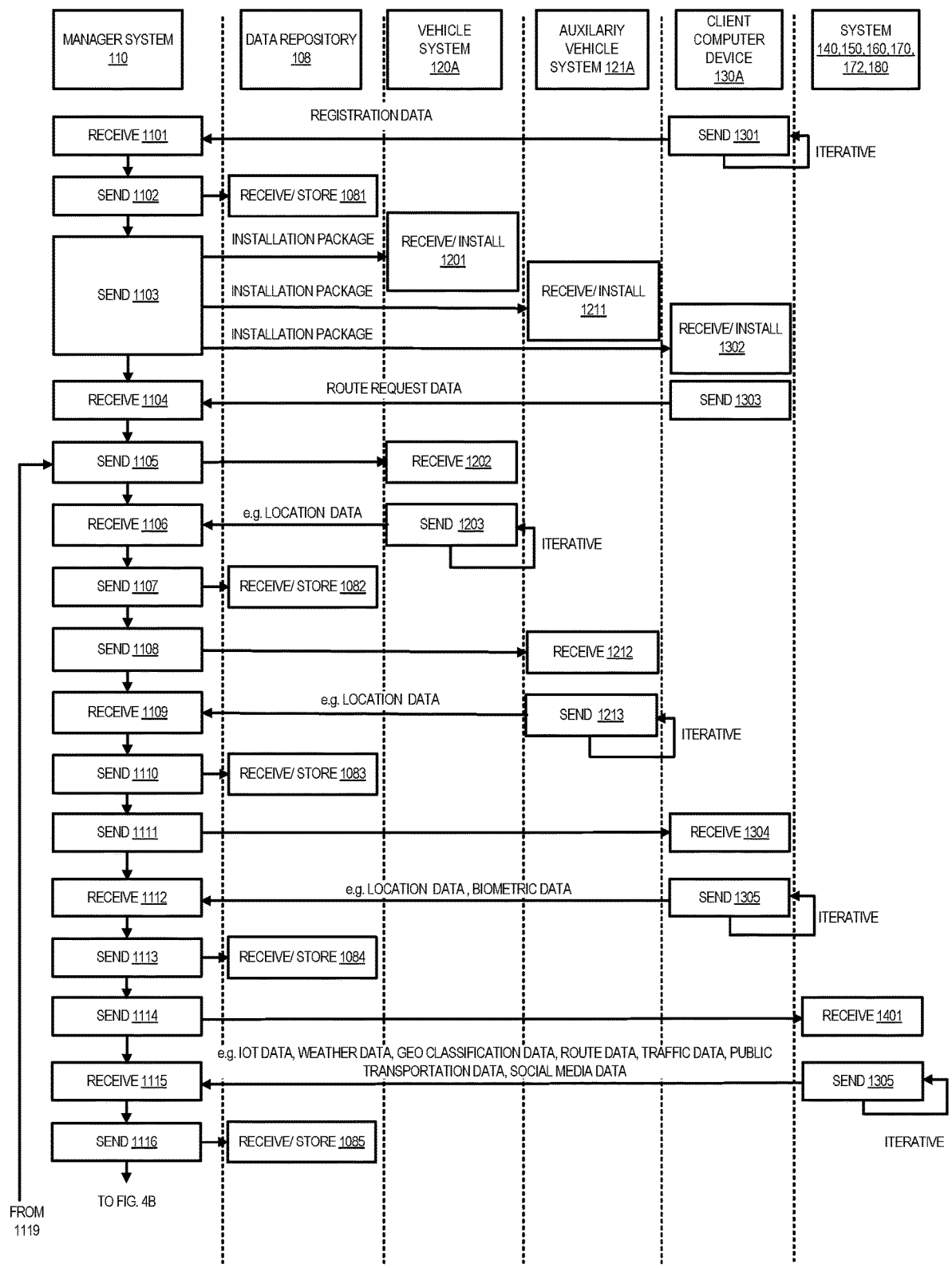
FIGS. 4A and 4B is a flowchart depicting a method for performance by a manager system interoperating with the vehicle system, a user auxiliary vehicle system, a client computer device, and various other systems according to one embodiment.
Figure 4B:
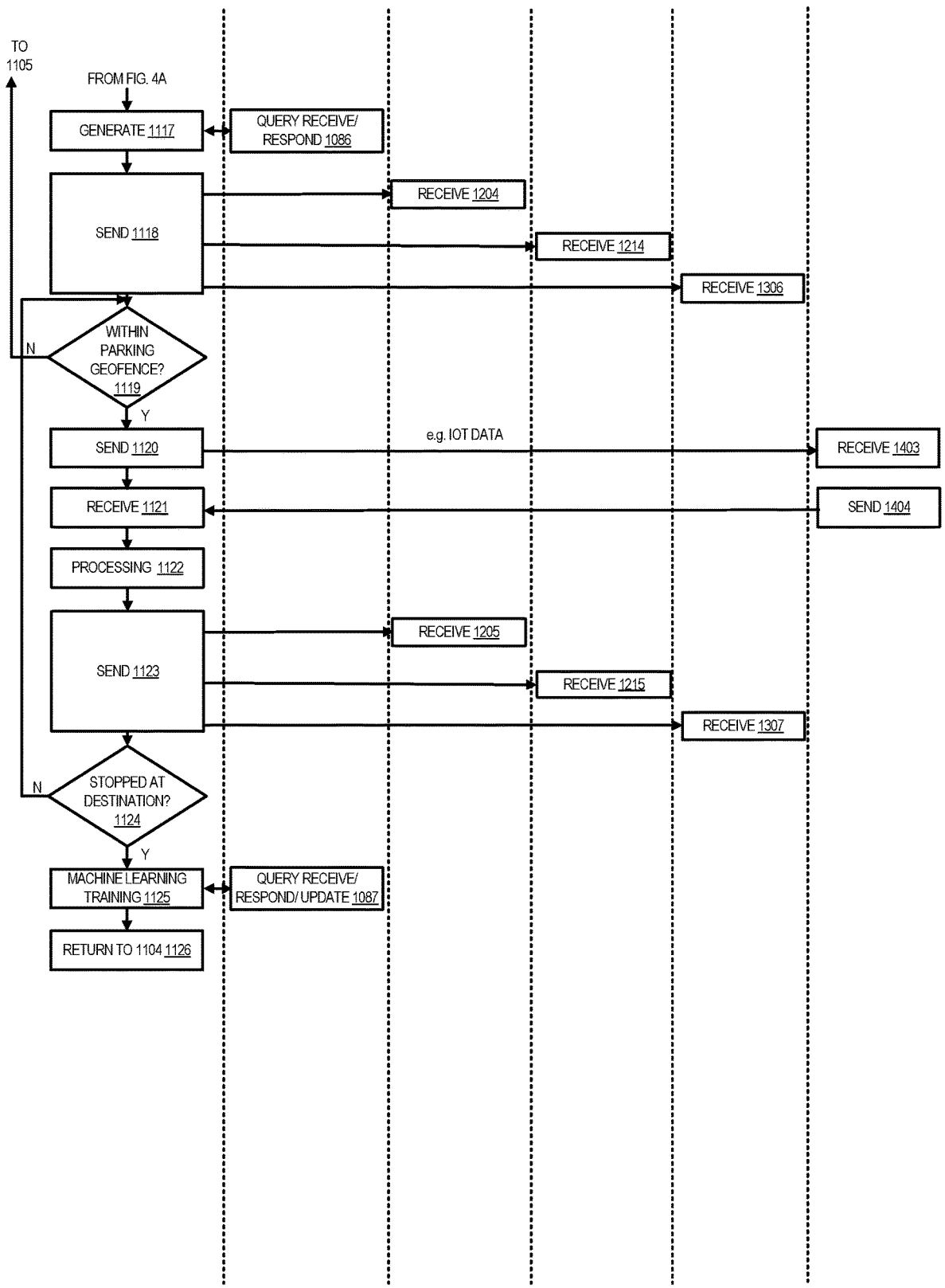

Flowchart of FIGS. 4A and 4B depict a method for performance manager system 110 interoperating with vehicle system 120A, user auxiliary vehicle system 121A, client computer device 130A, and systems 140, 150, 160, 170, 172, and 180.

At block 1101 manager system 110 can be receiving registration data from client computer device 130A. Client computer device 130A can be iteratively sending registration data at block 1301. A user can define registration data using registration area 5002 of user interface 5000 depicted in FIG. 5. User interface 5000 can be a displayed user interface for display on a display of client computer device of client computer devices 130A-130Z, such as client computer device 130A of user 129A (FIG. 3).

Registration data defined using registration area 5002 can include e.g. contacts data, permissions data, vehicles data, and preferences data. A user can enter contact data using area 5004 of registration area 5002. Contact data can include e.g. name, address, phone number, social media account data, and email address data. Permissions data can be defined using area 5006 of registration area 5002. Permissions data can include permissions specifying that manager system 110 can use e.g. location data of the user, including vehicles of the user, and social media data of the user. Vehicles data can be defined using area 5008 of registration area 5002. In vehicles area 5008 a user can enter data specifying vehicles associated to user. Vehicles associated to user can include e.g. user passenger vehicles and/or personal vehicles as set forth herein. A user can define preferences data using preferences area 5010 of registration area 5002. Preferences defined using preferences area 5010 can include e.g., air temperature preferences of a user and air conditioned preferences of a user. In response to the receipt of registration data at block 1101 manager system 110 can proceed to block 1102.

At block 1102, manager system 110 can send received registration data for receipt and storage by data repository 108 at block 1081. Received registration data can be stored in users area 2123 of data repository 108. In response to completion of block 1102 manager system 110 can establish an account for the user sending registration data at block 1301. Manager system 110 can assign a UUID for each new user and additional UUIDs for each vehicle including each user passenger vehicle and each user auxiliary vehicle provided by personal vehicle specified in registration data by a user on registration. In response to completion of block 1102 manager system 110 can proceed to block 1103. Manager system 110 can assign UUIDs to vehicles with reserved characters for referencing a vehicle type. Manager system 110 can determine a vehicle type based on registration data defined by a user to specify the vehicle type or can examine location data or other characterizing data from the vehicle systems discern vehicle type based on movement or other behavior characteristics of the vehicle systems.

At block 1103, manager system 110 can send installation packages for receipt by vehicle system 120A at block 1201, user auxiliary vehicle system 121A at block 1211, and client computer device 130A at block 1302. In response to the receipt of an installation package at block 1201 vehicle system 120A at block 1201 can install the installation package. In response to receipt of the installation package at block 1211 user auxiliary vehicle system 121A can install the installation package. In response to the receipt of the installation package at block 1302 client computer device 130A can install the installation package. Installation packages for receipt and installation of blocks 1201, 1211, and 1302 can include e.g. libraries and executable code that adapt and optimize vehicle system 120A, user auxiliary vehicle system 121A, and client computer device 130A for use in system 100. Installation packages for receipt and installation of blocks 1201, 1211, and 1302 can include e.g. UUIDs e.g. UUIDs for user passenger vehicles, user auxiliary vehicles, and users respectively so that vehicle system 120A, auxiliary vehicle system 121A and client computer device 130A respectively tag sent data for later sending to manager system 110 so that that manager system 110 can discern the source of the sent data. Assigned UUIDs for user passenger vehicles and user auxiliary vehicles can include reserved character sections that specify the vehicle type (e.g. user passenger vehicle, user auxiliary vehicle/motorized scooter, etc.). Depending on featurization, the installation packages can be, e.g. thick client installation packages or thin client installation packages. In response to completion of block 1103 manager system 110 can proceed to block 1104.

Figure 5:
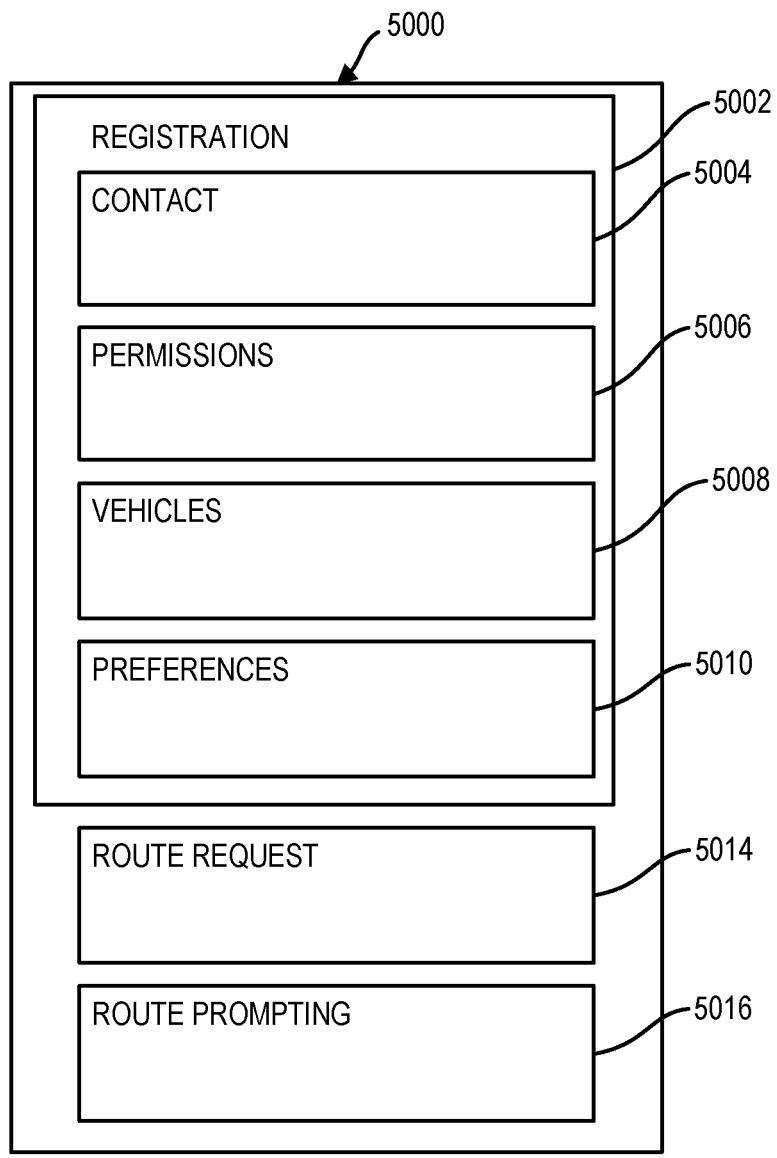
FIG. 5 depicts a user interface display usable by a user and displayed on a client computer device of a user and/or on a display of a vehicle system and/or a user auxiliary vehicle system associated to a user according to one embodiment.

At block 1104, manager system 110 can be receiving route request data from client computer device 130A. Client computer device 130A can be sending route requests data at block 1303 iteratively. The user can define route request data using route request area 5014 of user interface 5000 as shown in FIG. 5. A route request can include a specified route starting point and a route destination. A route starting point can be expressly specified by a user or, in the absence of an expressly specified starting location, can be entered by default as the current location of client computer device 130A.

At block 1104 manager system 110 can alternatively or additionally be receiving route request data defined by the user, such as user 129A using an associated user interface of vehicle system 120A and/or user auxiliary vehicle system 121A. In response to completion of block 1104 manager system 110 can proceed to block 1105 to send query data to vehicle system 120A for receipt of location data of vehicle system 120A. In response to completion of block 1104 manager system 110 can proceed to blocks 1105, 1108, 1111, and 1114 to send query data.

According to one embodiment, route request data defined by a user can specify a trip from a starting location to a destination location. As set forth herein, manager system 110 can generate a selected route in response to received route request data, which route request data can specify a trip of a user from a starting location to a destination location. Manager system 110 can be configured so that manager system 110 can iteratively update a selected route while the user performs the trip and travels to the destination location. As part of iteratively updating a route, manager system 110 can generate a multimode transportation route as the current selected route for the trip.

Query data sent at block 1105 can include query data to query current location of vehicle system 120A. Query data sent at block 1108 can include query data to determine current location of user auxiliary vehicle system 121A. Query data sent at block 1111 can include query data to query a current location of client computer device 130A. Query data sent at block 1114 can include query data to query various data from systems 140, 150, 160, 170, 172 and/or 180. Vehicle system 120A can receive the query data sent at block 1105 at block 1202 and can respond to the received query data at send block 1203. User auxiliary vehicle system 121A can receive the query data sent from manager system 110 at block 1108 at block 1212 and can respond to the query data at send block 1213. Client computer device 130A can receive the query data sent by manager system 110 at block 1111 at block 1304 and can respond to the query data at send block 1305. Systems 140, 150, 160, 170, 172, and/or 180 can receive the query data sent at block 1114 at block 1401 and can respond the query data at send block 1402. Manager system 110 can receive response data from vehicle system 120A at block 1106, can receive response data from user auxiliary vehicle system 121A at block 1109, can receive response data from client computer device 130A at block, 1112, and can receive response data from systems 140, 150, 160, 170, 172, and/or 180 at receive block 1115.

Manager system 110 can send received response data received from vehicle system 120A at block 1107 for receipt and storage by data repository 108 at block 1082. Manager system 110 at block 1110 can send received response data received from user auxiliary vehicle system 121A at block 1107. Manager system 110 can send received response data received at block 1106 to data repository 108 for receipt and storage by data repository 108 at block 1082. Manager system at block 1110 can send received response data received at block 1109 for receipt and stored by data repository 108 at block 1083. Manager system 110, at block 1113 can send received response data received at block 1112 for receipt and storage by data repository 108 at block 1084. Manager system 110 at block 1116 can send response data received at block 1115 for receipt and storage by data repository 108 at block 1085. Response data received by manager system 110 at block 1106 can include location data specifying a current location of vehicle system 120A. Received response data received by manager system 110 at block 1109 can include location data specifying a current location of user auxiliary vehicle system 121A. Received response data received by manager system 110 at block 1112 can include location data specifying a current location of client computer device 130A. Received response data received by manager system 11 at block 1115 can include e.g. IoT data of IoT sensor system 140, weather data from weather system 150, geo classification data received from geo classification system 160, route data and traffic data from ground traffic service system 170, public transportation data from public transportation service system 172, and social media data from social media system 180. In response to completion of block 1116 manager system 110 can proceed to block 1117 to generate a current route based on the route request data received block 1104.

Manager system 110 performing block 1117 can include manager system 110 performing multiple queries on data repository 108 as indicated by data repository 108 performing query receive and respond block 1086. Manager system 110 performing generate block 1117 can include manager system 110 activating transportation mode detection process 112, multimode transportation route determination process 113, and/or route evaluation process 114 (FIG. 1). Manager system 110 performing generate block 1117 can include manager system 110 performing the process as set forth in FIG. 4C, according to one embodiment. By iteratively storing location data of vehicle system 120A, user auxiliary vehicle system 121A, and client computer device 130A, manager system 110 can store data defining path data of vehicle system 120A, user auxiliary vehicle system 121A, and client computer device 130A. Path data of a system or device can be defined by location data of the system or device over time. With the path data stored manager system 110 can examine the path data to determine for any given time period whether any first and second vehicle are traveling together or not traveling together.

At block 1701 manager system 110 can determine whether user auxiliary vehicle system 121A is traveling together with vehicle system 120A. If manager system 110 at block 1701 determines that user auxiliary vehicle system 121A is traveling together with vehicle system 120A, manager system 110 can determine that a current transportation mode of user 129A is a user passenger vehicle transportation mode, and manager system 110 can proceed to block 1702.

Figure 6A:
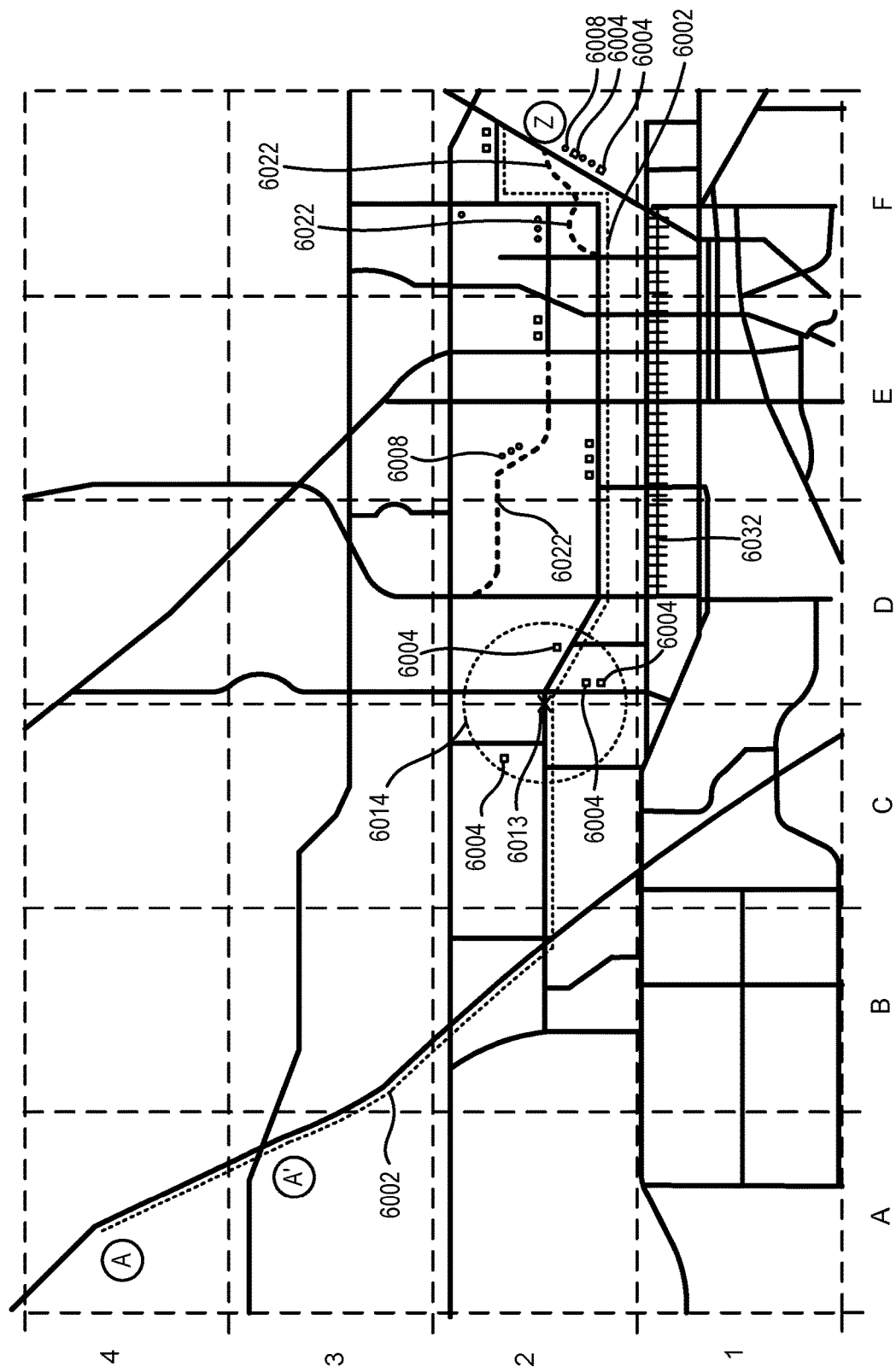
FIG. 6A is a geospatial map illustrating a route and a trip for performance by user in one or more of vehicle passenger transportation mode or user auxiliary vehicle transportation mode, according to one embodiment.

At block 1702, manager system 110 can set a baseline route for the vehicle associated to vehicle system 120A. For setting of a baseline route, according to one embodiment, manager system 110 can query ground traffic services system 170 for an optimum user passenger vehicle route, which route can be determined based on current traffic conditions. For example, referring to the geospatial map as depicted in FIG. 6A a return route can be the route depicted from starting location A to destination location Z and can be defined by route 6002 which specifies a sequence, e.g., a sequence of roadway turns to be performed by vehicle 1200, which is currently at start location A in response to completion of block 1702, manager system 110 can proceed to block 1703. Referring to the geospatial map of FIG. 6A, there are depicted parking spaces e.g. passenger vehicle parking spaces 6004 (circles) and auxiliary vehicle parking spaces (squares).

At block 1703 manager system 110 can examine cells in dependence on the determined baseline route determined at block 1702. Cells can be geospatial regions of the geospatial area supported by system 100. Cells can be predetermined geospatial regions. In the example of the geospatial spatial map of FIG. 6A, there are depicted 24 cells namely cell A1-F4. The cells depicted in FIG. 6A, are all square shaped and of a common size. However, according to alternative embodiments, the cells can be of different shapes e.g. rectangular, hexagonal, and the different cells can have different shapes and/or different sizes. For performing examining of cells at block 1703, according to one embodiment, manager system 110 can examine cells of the route determined at block 1702. The cells encompassing route 6002, in the example of FIG. 6A can include cell F2, cell E2, cell D2, cell C2, cell B2, cell B3, cell A3, and cell A4. Manager system 110 examining cells at block 1703 can include manager system 110 evaluating a predicted user passenger vehicle performance of the cell in comparison to predicted user auxiliary vehicle performance of the cell. The predicted user passenger vehicle performance can be a prediction of the performance of a user passenger vehicle through the cell and the predicted user auxiliary vehicle performance of the cell can be the predicted performance of a user auxiliary vehicle through the cell.

Embodiments herein recognize that in some scenarios traveling through geospatial region via a personal vehicle as opposed to user passenger vehicle can be advantageous. Accordingly, embodiments herein can establish transportation routes that are multimode transportation routes including more than one transportation mode, e.g., can include a first route segment in which transportation is to be conducted according to a user passenger vehicle transportation mode and a second route segment wherein transportation is to be conducted via a user auxiliary vehicle transportation mode. Embodiments herein recognize, for example, that when user passenger vehicle becomes crowded, traveling through geospatial region in a user passenger vehicle can become frustrating to a user. While embodiments herein also recognize that when user passenger vehicle traffic through a geospatial region becomes crowded, it may continue to be possible to travel through the geospatial region via a user auxiliary vehicle provided by personal vehicle without frustration. Embodiments herein can include scoring of a geospatial region based on predicted performance of a user passenger vehicle through the geospatial region in comparison to predicted performance of a user auxiliary vehicle through the same geospatial region.

Manager system 110 performing examining of cells at block 1703 can include manager system 110 applying Eq. 1 as set forth herein for comparing evaluating predicted performance of a user passenger vehicle through geospatial region in comparison to predicted performance of a user auxiliary vehicle through geospatial region.

$$S = F_1 W_1 + F_2 W_2 + F_3 W_3 + F_4 W_4 + F_5 W_5 \quad (\text{Eq. 1})$$

Where S is the predicted score of a user passenger vehicle or a user auxiliary vehicle through the geospatial region, e.g., a cell, $F_1$ is an average speed factor, $F_2$ is a parking factor, $F_3$ is a comfort factor, $F_4$ is a physical exhaustion factor, $F_5$ is a current route factor, and where $W_1$-$W_5$ are weights associated to the various factors.

Manager system 110 performing examining of cells at block 1703 can include manager system 110 commencing the examination of cells beginning with a final destination cell. Referring to FIG. 6A, a final destination cell can be regarded to be to a cell that includes the destination of a current trip in a current route. Thus, in the example of FIG. 6A, a final destination cell can be cell $F_2$ which encompasses destination Z.

Referring to Eq. 1 manager system 110 can use Eq. 1 to evaluate predicted performance of a user passenger vehicle within a cell in comparison to predicted performance of a user auxiliary vehicle within a cell. Thus, in evaluating a cell, manager system 110 can generate first and second S values using Eq. 1. Manager system 110 can generate a first S value $S_1$ where the first value $S_1$ is a value specifying the predicted performance of a user passenger vehicle through a cell and can generate a second value $S_2$ where $S_2$ is the predicted performance of a user auxiliary vehicle through the cell.

Manager system 110, using Eq. 1 can assign a higher value under factor $F_1$, average speed, wherein the predicted average speed of a vehicle, e.g. passenger or auxiliary is predicted to be higher and can assign a lower value under factor $F_1$ where a predicted average speed of a passenger or user auxiliary vehicle is predicted to be lower through a cell.

Figure 7A:
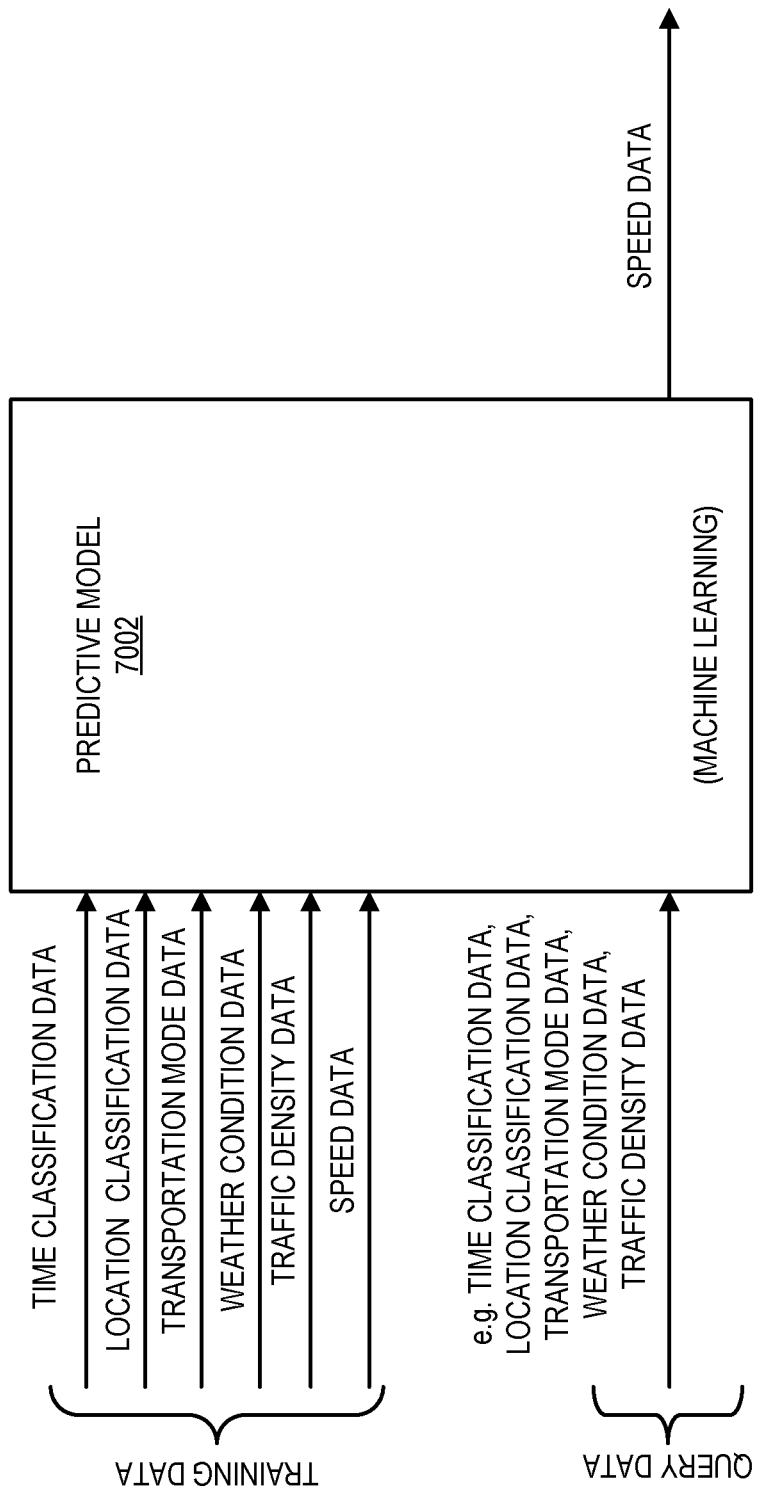
FIG. 7A is a predictive model for return of predictions in respect to average speeds of the vehicles traveling through a geospatial region or along the route segment according to one embodiment.

For determining a predicted average speed of the vehicle through the cell, manager system 110 can query predictive model such as predictive model 7002 as shown in FIG. 7A. Predictive model 7002 can be trained with training data so as to be responsive to query data.

System 100 can be configured so that as routes are performed by vehicles including user passenger vehicles and user auxiliary vehicles, manager system 110 can apply training data to predictive model 7002 so that predictive model learns how factors influence performance of a vehicle through a set of locations. Manager system 110 can apply supervised learning training datasets to predictive model 7002. Training datasets can include factors training data and results training data. Factors training data can include e.g., time classification data, location classification data, transportation mode data, and traffic density data. Results training data can include average speed data and can include e.g. time and/or distance and/or average speed (velocity) data. Average speed data applied as results training data can include data that specifies average speed and/or data from which average speed can be derived e.g., time and distance data.

Time classification data can include e.g. classification data that classifies a time during which a historical route was performed. Classification data can specify e.g. workday, weekend day, or holiday day. Time classification data can also specify an hour of the day in which route was performed. Location classification data can specify a cell traversed during a historical route. Location classification data can also or alternatively identify a segment of the route. For example, in respect to the geospatial map of FIG. 6A, each road segment of the depicted roadways can be assigned UUID and also each route segment defined by a trail segment traversable by a user auxiliary vehicle can be assigned to UUID. Transportation mode data can specify e.g. user passenger vehicle transportation mode, user auxiliary vehicle transportation mode, and/or or a sub classifier that classifies as the classification of a user auxiliary vehicle (user auxiliary vehicle transportation mode/motorized scooter). Weather condition data applied as training data can include e.g. general weather condition data, e.g. specifying air temperature, sunny conditions, cloudy conditions, rainy conditions, snowy conditions, and the like. Weather condition data applied training data can also or alternatively include road condition data applied as training data e.g. icy, snow cover conditions, wet, and the like. Manager system 110 can obtain weather condition data on completion of a route by a vehicle supported by system 100 by querying of weather system 150 and/or ground traffic services system 170, for example. Traffic density data applied as training data to predictive model 7002 can refer to a data value that characterizes traffic density during the route. Such data value can be obtained by querying e.g. ground traffic services system 170.

Predictive model 7002, once trained, can be able to respond to query data. Query data applied to predictive model 7002 by manager system 110 at block 1703 can include one or more of time classification data for the current route at the final destinations, location classification data, e.g. cell ID for the final destination cell, transportation mode classifier (for $S_1$, user passenger vehicle, for $S_2$, user auxiliary vehicle transportation mode for the auxiliary vehicle being carried by the user's passenger vehicle) current route weather condition data, i.e., the predicted weather conditions of the cell when encountered in the future during performance of the current route, traffic density data specifying the expected predicted traffic density at the cell to be encountered at a predicted time according the baseline route. Manager system can obtain the described query data during last iteration of block 1115 to receive data from one or more of systems 140, 150, 160, 170, 172, and 180. In response to the one or more types of query data predictive model 7002 can return output data. The output data using predictive model 7002 can be a predicted average speed data specifying a predicted average speed for a vehicle through the cell (a user passenger vehicle for the $S_1$ calculation, a user auxiliary vehicle for the $S_2$ calculation).

Manager system 110 can apply training data for training of predictive model 7002 on expiration of each successive predetermined time period of interest, e.g., each successive one hour time period of interest according to one example, or another selected time period.

Referring to geospatial map of FIG. 6A, a user passenger vehicle carrying a user and a user auxiliary vehicle can be at location A during an early iteration of block 1703. For early iterations of block 1703 according to one example, predicted performance of a user passenger vehicle transportation mode can exceed predicted performance of a user auxiliary vehicle transportation mode. For subsequent iterations of block 1703 according to one example (when a user moves away from location A), predicted performance of a user auxiliary vehicle transportation mode might exceed predicted performance of a user passenger vehicle transportation mode, at which point manager system 110 can generate a multimode transportation route as the selected current route for a trip.

Weather condition data, and traffic density data applied as query data to predictive model 7002 can be predicted future (referencing the time the user will reach the destination location using the baseline route) weather condition data, and traffic density data as may be determined during most recent iteration of block 1115 to receive query response data from systems 140, 150, 160, 170, 172, and 180. Manager system 110 can apply query data to predictive model 7002 to return average speed data and then apply the returned average speed data into Eq. 1 for determination of S scores specifying predicted performance of the user passenger vehicle and user auxiliary vehicle through a certain cell e.g., commencing with a final destination cell encompassing destination Z as shown in FIG. 6A.

Figure 7B:
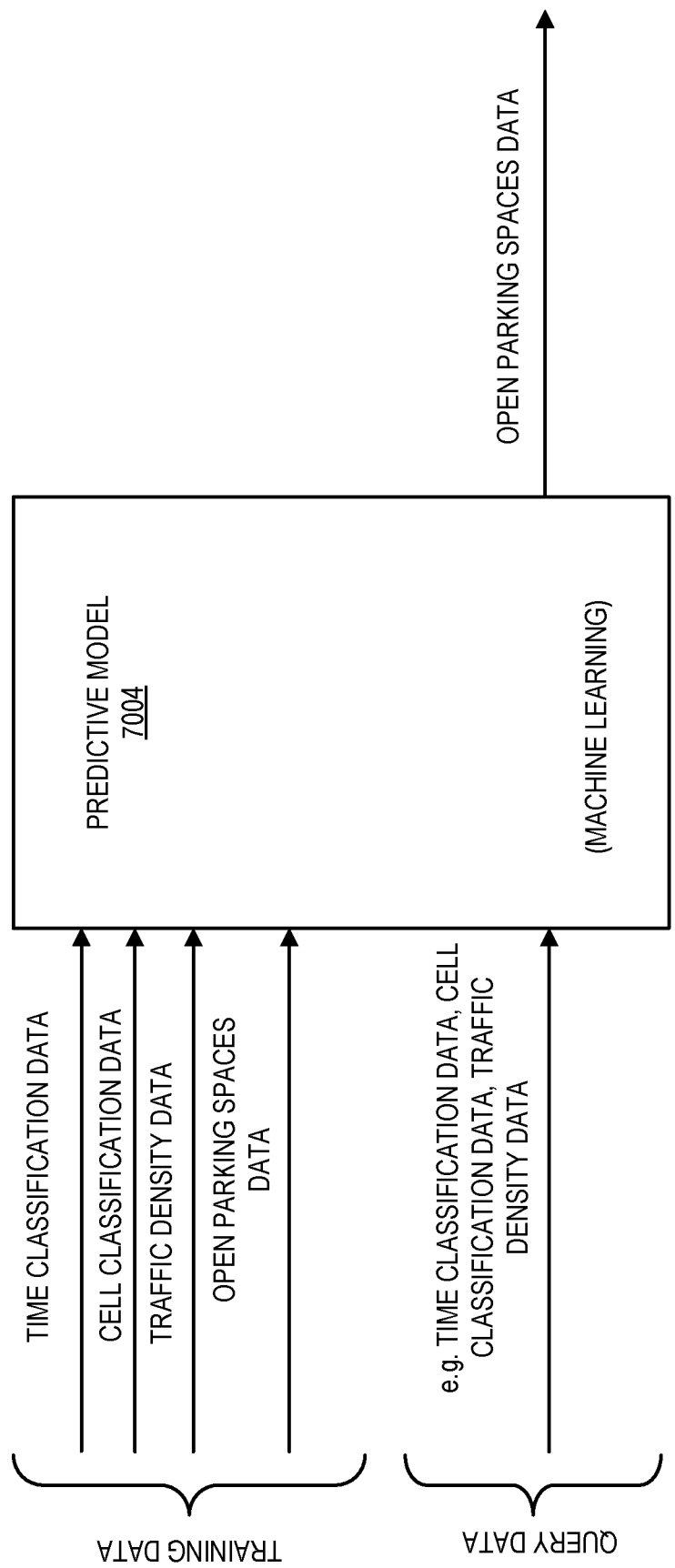
FIG. 7B is a predictive model for return of predictions as to open parking spaces within geospatial region according to one embodiment.

Referring to factor $F_2$ of Eq. 1, factor $F_2$ can be a parking factor. Manager system 110 can assign a higher value according to factor $F_2$ when parking is predicted to be more accessible and can assign lower value under factor $F_2$ when parking is predicted to be less accessible. For predicting parking availability manager system 110 can query predictive model 7004 as depicted in FIG. 7B. Predictive model 7004 can be trained with applied training data provided by historical data so as to learn a relationship between traffic density and parking availability. Each cell of geospatial area supported by system 100 can be modeled to predict parking availability with use of predictive model 7004. Training data applied to predictive model 7004 can include the factors labeled training data such as time classification data, cell classification data, traffic density data, and results labeled training data. Results labeled training data applied to predictive model 7004 can include identified open parking spaces which can have been identified by manager system by processing of IoT data obtained from IoT sensor system 140. Different instances of predictive model 7004 can be trained, wherein each different instance can be associated to a different parking space type, e.g., parking space for user passenger vehicle, parking space for user auxiliary vehicle of a certain user auxiliary vehicle sub classification.

The training dataset can be applied for training of predictive model 7004 on completion of each successive predetermined time period of interest, e.g., each successive one hour time period of interest according to one example. A number of open parking spaces can be determined by examination of data returned from an IoT sensor system 140 as may be determined by processing the received IoT data received during the last most recent iteration of block 1115.

Manager system 110 applying comfort factor $F_3$ can assign a higher value under factor $F_3$ where a predicted comfort level of the user when traveling through a cell e.g. riding on a user passenger vehicle of the user or a user auxiliary vehicle where the user is predicted to be more comfortable and can assign a lower value under factor $F_3$ were the user is predicted to be less comfortable. In the case of a user traveling in a user passenger vehicle, according to one embodiment, a predicted comfort level can be predicted, according to one example to not change substantially in dependence on weather conditions. However, in the case of a user auxiliary vehicle provided by a personal vehicle predicted comfort level of user can be in dependence on predicted weather conditions when the user travels through the cell of a current trip and current route at a predicted future time.

Regarding factor $F_3$ manager system 110 can apply a different comfort criterion set comprising one or more criteria in dependence on a vehicle type associated to the future cell traversal. That is, manager system 110 can use the decision data structure of Table A below for loading of a certainly selected criterion set. Manager system 110 can detect an auxiliary vehicle type at block 1701 (FIG. 4C) when determining whether a user auxiliary vehicle of a user is traveling with a user passenger vehicle of the user. Installation packages sent at block 1103 can include assigned UUIDs for user passenger vehicles, user auxiliary vehicles, and client computer devices mapping to users. The UUIDs for vehicles can be provided to include reserved reference characters specifying vehicle type (e.g. with predetermined character strings associated to predetermined vehicle type). Received location data received from a vehicle system at block 1106 (from vehicle system 120A) and at block 1109 (from system) can be tagged with the assigned UUIDs sent at block 1103. Accordingly, manager system 110 can identity a vehicle type (user passenger vehicle, user auxiliary vehicle/motorized vehicle etc.) by examination of received UUID data.

TABLE A

| Row | Vehicle Type | Criterion Set |
|---|---|---|
| 1 | User passenger vehicle | A001 |
| 2 | User auxiliary vehicle - Motorized Scooter | A002 |
| 3 | User auxiliary vehicle - Bicycle | A003 |
| ... | ... | ... |

As depicted in Table A manager system 110 can load a different criterion set in dependence on a vehicle type associated to the future traversal of a cell. Manager system 110 can iteratively adjust the criterion sets associated with the different roles of Table A over time during the course of deployment of system 100. For example, over time, a user can define different preference data specifying preferences of the user in terms of preferred weather conditions using area 5010 of user interface 5000 shown in FIG. 5. Manager system 110 can iteratively query social media system 180 to determine preferences of the user. Return data from social media system 180 can be processed by manager system 110 by activation of NLP process 115 to determine sentiments associated with topics. Thus, if the user enters posts data into social media forms such as "I don't like cycling when it's very sunny", manager system 110 by activation of NLP process 115 can extract a negative sentiment associated to the topics "bicycling" and "sunny" so as to adjust the criterion set A003 of Table A, in the manner that predicted sunny conditions return lower comfort score in the case that a vehicle to traverse the cell at a future time is a bicycle.

Manager system 110 applying physical exhaustion factor $F_4$ can assign a higher value under factor $F_4$ where the user is predicted to exhaust limited physical energy during the performance during travel through the cell and can assign a lower value under factor $F_4$ where users predicted expenditure of physical energy is expected to be greater. For applying factor $F_4$ manager system 110 can use the decision data structure such as Table B below.

TABLE B

| Row | Vehicle Type | Criterion Set |
|---|---|---|
| 1 | User passenger vehicle | B001 |
| 2 | User auxiliary vehicle - Motorized Scooter | B002 |
| 3 | User auxiliary vehicle - Bicycle | B003 |
| ... | ... | ... |

Referring to Table B, criterion set B003 associated with row three (user auxiliary vehicle—bicycle) can be established so that a lower score can be returned under factor $F_4$, given that the user can be expected to be using substantial physical energy using the specified user auxiliary vehicle. Manager system 110 can assign higher values according to factor $F_4$ where cell traversal being evaluated is a second or Nth cell being evaluated for traversal by user using a manually powered user auxiliary vehicle. That is, manager system 110 can assign higher values under factor $F_4$, where the user under a traversal scenario being evaluated is specified to travel longer distances.

Referring to Table B manager system 110 can assign moderate values under factor $F_4$ when Row 2 is fired, i.e. when the motorized scooter is the user auxiliary vehicle and can assign highest values under factor $F_4$ when the specified vehicle is a user passenger vehicle of the user (i.e. the lowest amount of physical energy expenditure).

Manager system 110 applying factor $F_5$ (current route factor) can assign a higher value where the higher value under factor $F_5$ increases the likelihood of the current route being reselected and being unchanged and can assign a lower value according to factor $F_5$, where a higher value under factor $F_5$ increases the likelihood of a changed route regarding factor $F_5$. Embodiments herein recognize that continuing with the current route can provide advantages to a user, e.g., in terms of the user's understanding of a current route, avoiding of confusion to a user. A re-selection of a current route can occur where an entirety of route segments from a current location to a destination location were included in a prior route.

In reference to the geospatial map of FIG. 6A, cell F2 can define a final destination cell that encompasses a destination location Z. Manager system 110 can be configured so that if manager system 110 on evaluation of destination cell F2, determines that a user auxiliary vehicle is predicted to outperform a user passenger vehicle through the destination cell F2, manager system 110 can proceed to perform an evaluation as described in connection with Eq. 1 with respect to an adjacent destination cell. The adjacent destination cell can be a cell adjacent to the final destination cell which encompasses the current route, which in the described example, is route 6002 as depicted in FIG. 6A. Thus, in the described example of FIG. 6A cell E2 can be an adjacent destination cell adjacent to destination cell F2. Manager system 110, at block 1703 can proceed to iteratively evaluate adjacent destination cells until, on evaluation of a cell, manager system 110 determines that a user passenger vehicle through an adjacent destination cell is predicted using Eq. 1, to outperform a user auxiliary vehicle through the cell.

Manager system 110 at block 1703, in response to determining that there is one or more destination cell for which a user auxiliary vehicle is predicted to outperform a user passenger vehicle using Eq. 1 can establish a multimode transportation route in which a first transportation mode, i.e. a user passenger vehicle transportation mode can be used for first route segment of a trip and a second transportation mode, i.e. a user auxiliary vehicle transportation mode can be used for second route segment of the trip. Route segments herein can include one or more sub segments. On performance of examining cells block 1703 manager system 110 can proceed to block 1704.

At block 1704 manager system 110 can determine whether there are N adjacent destination cells satisfying the criterion. The criterion can be that N adjacent cell destination cells satisfy the criterion wherein a predicted performance of a user auxiliary vehicle through the N adjacent cells exceeds the predicted performance of a user passenger vehicle through the N adjacent cells. System 100 can be configured according to one embodiment so that under light traffic conditions, there is less likelihood using Eq. 1 of user auxiliary vehicle being predicted to outperform a user passenger vehicle through a cell. Accordingly, under light traffic conditions, e.g., on a weekend morning manager system 110 can be expected to establish as a route for a current trip, a single mode route, i.e., a route that is of the single mode transportation mode, i.e. a user passenger vehicle transportation mode all the way from the start location A to destination location Z. It can be seen, however, according to Eq. 1 that system 100 can be configured so that in the case of heavier traffic conditions use of Eq. 1 is more likely to return the determination that a user auxiliary vehicle is predicted to outperform a user passenger vehicle through a cell. Accordingly, in the case of heavier traffic conditions and with other conditions as expressed in Eq. 1 being present, manager system 110 with use of Eq. 1 can return the decision to establish as a route for a current trip, a multimode transportation route in which a first route segment is performed with use of a user passenger vehicle transportation mode and a second route segment of the trip is performed with use of a user auxiliary vehicle transportation mode. In another aspect, manager system 110 can be configured to dynamically adjust a current route for a current trip based on changes as determined by processing of iteratively obtained data for processing.

Referring again to the flowchart of FIGS. 4A and 4B manager system 110 can be iteratively performing the loop comprising blocks 1105-1119. During performance of the trip manager system 110 can dynamically update a current route for the trip. In one example, manager system 110, during performance of a trip can dynamically update a current route for the trip so that the current route for the trip dynamically transitions between a single mode transportation route in which the current route is designated as a single transportation mode route into a multimode transportation route in which the current trip is designated to be performed during a first part in a user passenger vehicle transportation mode and in a second part is a user auxiliary vehicle mode transportation mode trip. For example, during an early iteration of block 1117, i.e., where a user passenger vehicle was proximate starting location A, manager system 110 can establish a current route for a trip as a single mode user passenger vehicle mode. However, at a later iteration e.g. where a user passenger vehicle is at location A' as depicted in FIG. 6A, conditions may have changed, i.e. the predicted traffic density through cells may increase, predicted weather in a cell may change, or a user may execute an unplanned stop, thereby altering the predicted arrival time at a destination. Thus, in one scenario manager system 110, during an iteration of generate block 1117, when a user passenger vehicle user is at location A' manager system 110 can return an action decision to generate, as a current route for a trip, a multimode transportation route that comprises a first part performed in accordance with a user passenger vehicle transportation mode and in a second part a user auxiliary vehicle transportation mode in which the user rides the user's auxiliary vehicle.

Figure 4C:
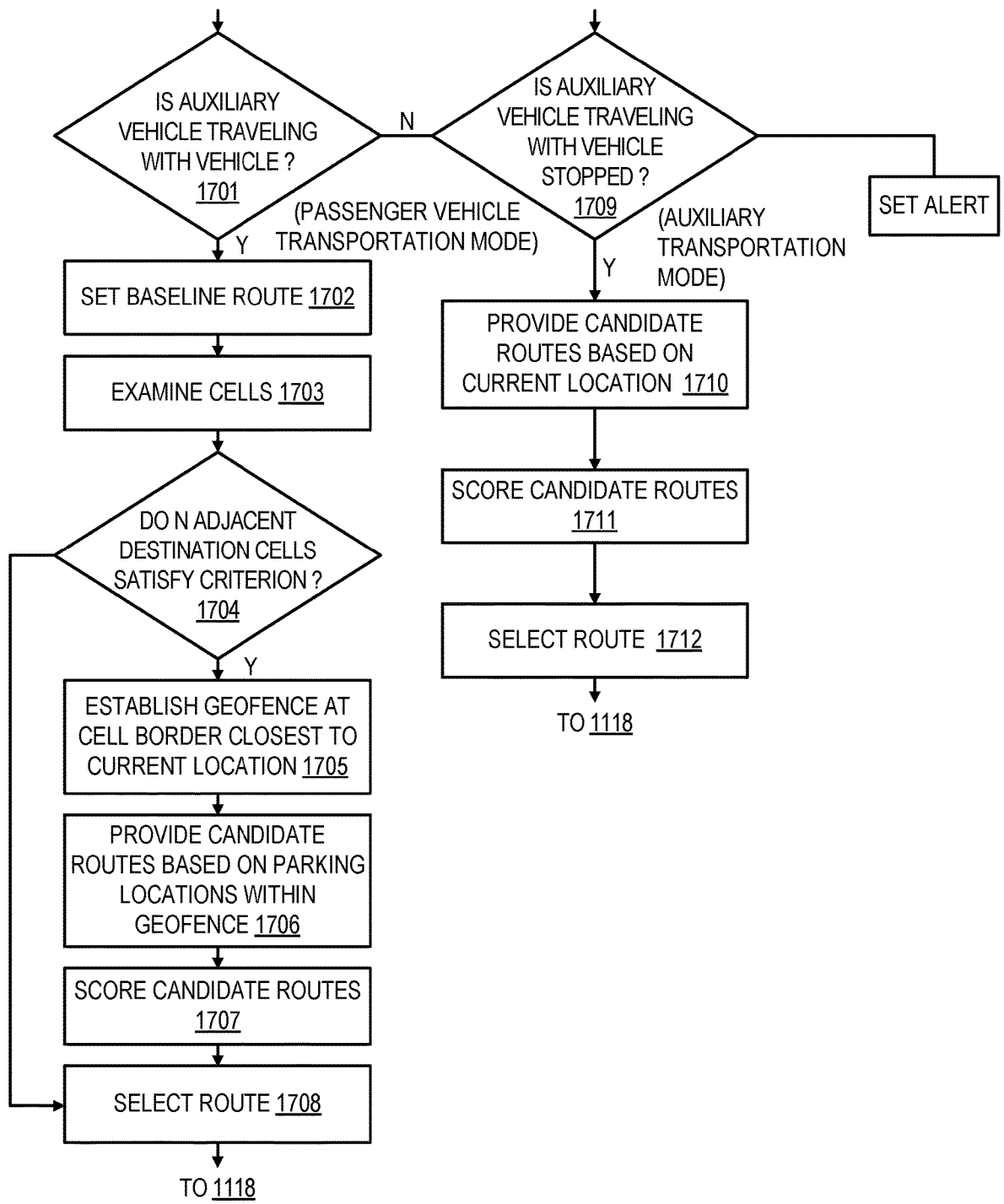
FIG. 4C depicts a method for performance by a manager system according to one embodiment.

Reference is now made again to the flowchart of FIG. 4C. On the determination at block 1704 that there are N adjacent destination cells in which a predicted performance of a user auxiliary vehicle through the cell exceeds a predicted performance of a user passenger vehicle through the cell manager system 110 can proceed to block 1705.

At block 1705 manager system 110 can establish a geofence that a cell border closest to a current location of a user passenger vehicle of a user. For example, with reference to the geospatial map of FIG. 6A, according to one embodiment, a user passenger vehicle of the user can be at starting location A, using Eq. 1, the predicted performance of a user auxiliary vehicle through a cell can be predicted to exceed the performance predicted performance of a user passenger vehicle through the cell for destination cells F2, E2, and D2. Thus, the cell border closest to a current location of the vehicle of a user passenger vehicle of the user in the described example can be the border between cell D2 and cell C2. At block 1705 manager system 110 can establish geofence 6014 at the border between cell D2 and cell C2 and at location and geofence 6014 can be centered on location 6013 of the cell border wherein location 6013 is the location at which the current route intersects the border. Manager system 110 at block 1705 can establish geofence 6014 to identify a breaking point between a user passenger vehicle transportation mode and a user auxiliary vehicle transportation mode. At the breaking point, a user can exit the user's user passenger vehicle and begin traveling using the user's user auxiliary vehicle. Based on Artificial Intelligence (AI) featurizations herein, the breaking point can be a point identified to obtain a balance of advantages associated with both transportation in a user passenger vehicle transportation mode and a user auxiliary vehicle transportation mode.

With geofence 6014 established at block 1705, manager system 110 at block 1705 can identify open parking areas for a user passenger vehicle within geofence 6014. Predicted open parking spaces within geofence 6014 can be determined based on identification of current open parking spaces within geofence 6014. For example, manager system 110 can examine most recently received IoT data received at block 1115, during the most recent iteration to identify currently open user passenger vehicle parking spots within geofence 6014. Manager system 110, with currently open user passenger vehicle parking spots identified can query predictive model 7004 to determine a likelihood of identified parking spots remaining open at a time when the user passenger vehicle of the user is predicted to reach the location of the open parking spot. Based on the predicted likelihood exceeding a threshold manager system 110 can identify a currently open user passenger vehicle parking spot as a predicted open parking spot predicted to remain open at a time when the user passenger vehicle of the user reaches the identified parking spot. It will be seen with predicted open parking spots within geofence 6014 identified manager system 110 can provide a plurality of alternative candidate routes using each of the identified predicted open parking spots. Manager system 110 at block 1706 can provide candidate routes for an auxiliary transportation mode using each of the identified predicted open parking spaces identified at block 1705.

Figure 6B:
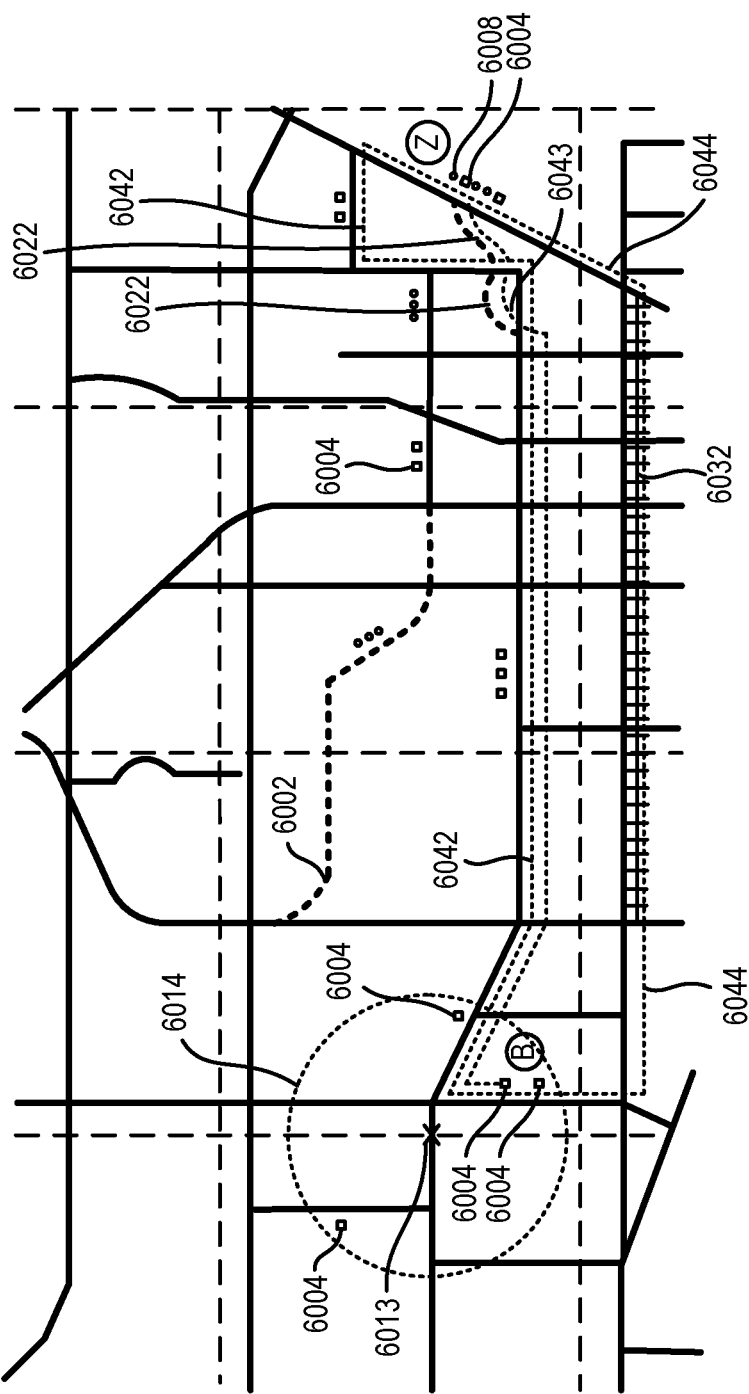
FIG. 6B is an exploded geospatial map highlighting a portion of the geospatial map of FIG. 6A depicting features in respect to splitting of a trip between user passenger vehicle transportation mode and user auxiliary vehicle transportation mode according to one embodiment.

Referring to the geospatial map of FIG. 6B, manager system 110 can identify passenger vehicle parking spaces 6004 as predicted open parking spots associated to geofence 6014.

Manager system 110 can provide alternative candidate auxiliary transportation mode routes for each of the predicted open parking spaces within geofence 6014. In FIG. 6B, representative candidate routes are depicted for the predicted open parking spot at location B of FIG. 6B. Candidate routes for evaluation can be defined respectively by candidate route segment 6042, candidate route segment 6043, and candidate route segment 6044. Candidate route segment 6042 can include only roadway route segments between location B and destination location Z. Candidate route segment 6043 can include route segments that comprise roadway route segments and can also include trail route segments, i.e., comprising first and second trail segments 6022 as depicted proximate destination location Z. According to one example manager system 110 can select a candidate route having a route segment commencing at location B as the selected route. In such an example, manager system 110 can establish location B as the breaking point of a multimode transportation route.

Manager system 100 can be configured so that one determining using Eq. 1 that a user auxiliary vehicle mode is predicted to outperform a user passenger vehicle mode, manager system 110 can evaluate candidate alternative routes that are further diversified to include public vehicle transportation route segments. Candidate route segment 6044 can include roadway route segments and also a public transportation route segment. That is, route segment 6032 can specify a route segment in which a transportation route comprises travel using public transportation, e.g., a train. Accordingly, at generate block 1117 manager system 110 in some cases can generate as a current selected route for a current trip a multimode route that includes a first one or more route segment to be traveled in a user passenger vehicle mode, a second one or more route segment to be traveled in a user auxiliary transportation mode and a third one or more route segment to be traveled in a public vehicle transportation mode. Route segments 6042, 6043, and 6044 respectively define candidate routes with the remaining portion of the route to be traveled between a current location (e.g. location A or A') and the candidate break point being evaluated, e.g. location B. Manager system 110 for evaluating the various candidate routes having various candidate breaking points can obtain optimum passenger vehicle route data from a current location to the candidate breaking point location from ground traffic service system 170.

Manager system 110 can evaluate the different candidate routes provided at block 1706 using Eq. 2 to score alternative candidate routes. According to one embodiment, scoring formula for scoring alternative user auxiliary vehicle routes can be provided as follows.

$$P = RF_1 W_1 + RF_2 W_2 + RF_3 W_3 + RF_4 W_4 \quad \text{(Eq. 2)}$$

Where P is a predicted performance score for a candidate route being evaluated, where $RF_1$ is a predicted destination arrival time associated to the candidate route, where $RF_2$ is a predicted comfort level associated to the route, where $RF_3$ is a predicted physical exhaustion factor associated to the route, and where $RF_4$ is a current route factor.

Manager system 110 at block 1707 can score the various candidate routes using Eq. 1 and at block 1708 can select the highest scoring candidate route as the current selected route for a current trip. Manager system 110 can assign a higher value under factor $RF_1$ where the predicted arrival time using the candidate route is earlier and can assign a lower value according to factor $RF_1$ where a predicted arrival time associated to the route is lower. Manager system 110 for assigning values according to factor $RF_1$ can query predictive model 7002 which, as explained in connection with FIG. 7A, may have been trained to predict average speeds associated to different route segments in dependence on various query factors such as time classifiers, predicted weather condition factors, predicted travel density factors. For determining the predicted arrival time associated to a given candidate route segment, manager system 110 can aggregate predicted intermediate location arrival times associated to the various different route segments defining a candidate route. Manager system 110 applying factor $RF_1$ can also query predictive model 7004 to adjust the predicted arrival time in dependence on predicted parking space availability.

Manager system 110 applying factor $RF_2$ can assign a higher value under factor $RF_2$ where a user is predicted to be more comfortable during performance of the candidate route being evaluated and can assign a lower value under factor $RF_2$ where the users predicted to be less comfortable during travel according to the candidate route.

Manager system 110 applying factor $RF_3$ can include manager system 110 using the decision data structure of Table C to apply different comfort specifying criterion sets in dependence on a user auxiliary vehicle being used by a user for a route segment or a set of route segments defining a route. Where a route segment includes an associated enclosed environment as may be expected in the case that the user will be traveling in a public vehicle provided by a public train having a close environment, the comfort level of a user can be expected to be less impacted by weather conditions. Accordingly, the criterion set of Table C associated to Row 3 can result in assigning according to factor $RF_3$ a weather condition in dependent on comfort level for the segment. Referring to the decision data structure of Table C, manager system 110 applying criterion sets C001 or C002 can assign a comfort level in dependence on weather conditions, e.g. can assign relatively high comfort level values according to factor $RF_3$ in the case of moderately warm temperatures with no precipitation and can assign relatively low comfort values applying criterion set C001 or C002 (Row 1 or Row 2) in the case, e.g. that temperature is colder than a threshold value or in the case a predicted weather condition for a route segment of the candidate route specifies predicted weather conditions. It will be seen that in the case that candidate routes are being evaluated, manager system 110 can use current weather conditions or traffic conditions in the case that a user is predicted to traverse the segment in the near term.

TABLE C

| Row | Vehicle Type | Criterion Set |
|---|---|---|
| 1 | User auxiliary vehicle - Motorized Scooter | C001 |
| 2 | User auxiliary vehicle - Bicycle | C002 |
| 3 | Public vehicle - Train | C003 |
| ... | ... | ... |

Manager system 110 applying factor $RF_3$, which is a physical exhaustion factor can assign higher values under factor $RF_3$ where a candidate route is predicted to less significantly physically exhaust a user and can assign lower values under factor $RF_3$ in the case a candidate route segment defining a route is predicted to more substantially physically exhaust a user. Manager system 110 applying factor $RF_3$ can include manager system 110 using the decision data structure of Table D with use of the decision data structure of Table D, manager system 110 can select the criterion set for use in determining an assigned physical exhaustion value in dependence on vehicle type being used by a user for a route segment.

TABLE D

| Row | Vehicle Type | Criterion Set |
|---|---|---|
| 1 | User auxiliary vehicle - Motorized Scooter | D001 |
| 2 | User auxiliary vehicle - Bicycle | D002 |

TABLE D-continued

| Row | Vehicle Type | Criterion Set |
|---|---|---|
| 3 | Public vehicle - Train | D003 |
| ... | ... | ... |

Referring to Table D, manually powered vehicles such as bicycles, as specified in Row 2, can trigger action decisions to assign lowest values under the physical exhaustion factor, factor $RF_3$ motorized user auxiliary vehicles, such as specified in Row 2 can trigger action decisions to assign a second lowest value under the physical exhaustion factor and Row 3 (public vehicle) can trigger action decisions wherein higher physical exhaustion scores are assigned under factor $RF_4$ with the higher score indicating that physical exhaustion favorably is anticipated not to be significant and not to detract from performance of a route segment.

Manager system 110 applying factor $RF_5$ can include manager system 110 assigning a higher value according to factor $RF_5$, wherein the higher value increases the likelihood of a current route being maintained and can assign a lower value according to factor $RF_5$ in the case that a higher value increases the likelihood of transitioning a current route of a user to a different route. Embodiments herein recognize that maintaining an existing route can be favorable, e.g. in terms of yielding improved understanding by a user of a route and less confusion to a user regarding a route being traversed by the user.

Manager system 110 at select route block 1708 can select the highest scoring route of the candidate routes, where candidate routes have been provided at block 1706. In the case that decision block 1704 yielded a determination that the final destination cell has a higher predicted performance for a user passenger vehicle transportation mode as compared to a user auxiliary vehicle transportation mode, the route selection by manager system 110 at block 1708 can comprise manager system 110 generating by selecting the baseline route set at block 1702 as the current route for a specified trip of a user. It will be seen, with reference to examine cells block 1703, that manager system 110 can iteratively return a decision to maintain a current user passenger vehicle mode route until and unless an examination of one or more destination cells yields a determination that an auxiliary transportation mode route for the one or more destination cell is predicted to outperform the user passenger vehicle transportation mode for the cells. With the current route selected, and thus generated at block 1708, manager system 110 can proceed to block 1118 as depicted in FIG. 4B.

At block 1118, manager system 110 can provide one or more output in dependence on the route selected and generated at block 1117. At block 1118, manager system 110 can send, e.g. prompting data and/or navigation data for receipt by vehicle system 120A, user auxiliary vehicle system 121A, and/or client computer device 130A respectively at blocks 1204, 1214, and 1306. As set forth herein, the current route generated at block 1117 by manager system 110 can include, e.g. a multimode transportation route including a user passenger vehicle transportation route and a user auxiliary vehicle transportation route, or alternatively can comprise a single mode transportation route, e.g. consisting entirely of a user passenger vehicle transportation route or alternatively entirely of a user auxiliary vehicle transportation route. In some embodiments, a user auxiliary vehicle transportation route can specify that a user will transition vehicles, e.g. from a personal vehicle to a public transportation vehicle in the case of a user auxiliary vehicle transportation route.

Manager system 110 at block 1118 can send prompting data and/or navigation data for implementation of the generated route generated at block 1117. Prompting data can include data for presentment to a user that prompts the user to take action so that the route is performed. The prompting data can include, e.g. audio prompting data and/or visual prompting data that can be presented in prompting area 5016 of user interface 5000 as set forth in FIG. 5 for display on display of a client computer device or user interface 5000 can additionally or alternatively be displayed on a display for viewing by a user on a user interface display of vehicle system 120A or user auxiliary vehicle system 121A. In the case manager system 110 at block 1118 sends navigation data, the receiving system or device, i.e. vehicle system 120A, user auxiliary vehicle system 121A, and/or client computer device 130A can automatically perform navigation in accordance with the navigation data so that the user is automatically transported along the current route toward a destination without manual action by the user. For example, in such a described embodiment, vehicle system 120A can define a self-driving user passenger vehicle and user auxiliary vehicle 121A can define a self-driving user auxiliary vehicle. Manager system 110 on completion of block 1118 can proceed to block 1119 to determine whether the user is within a parking geofence.

Referring again to the geospatial map of FIG. 6B, manager system 110 can select as a current route for a current trip a multimode transportation route in which a user can travel from start location A to intermediate location B as shown in FIG. 6B, and at location B the user can transition into a user auxiliary vehicle transportation mode, e.g. to ride a motorized scooter of the user or another alternative vehicle until arriving at destination Z. In the case that manger system 110 generated a multimode route as the current route, prompting data sent at block 1118 which can be presented in prompting area 5016 of user interface 5000 of FIG. 5 can include prompting data to prompt the user, e.g. to travel at the predicted open parking spot associated to location B and can further include prompting data to prompt the user when arriving at the predicted open parking space associated to location B to disembark the user passenger vehicle of the user and transition into travelling in a user auxiliary vehicle transportation mode, e.g. riding a motorized scooter of the user (or an alternative user auxiliary vehicle commencing at location B).

According to one embodiment, when a user is within a geofence 6064 defined about a destination location, e.g. the location defined by destination Z as specified in FIG. 6A, manager system 110 can transition into a parking guiding mode of operation that is described with reference to blocks 1120-1124.

In the case that a user has not breached a parking geofence, manager system 110 can return to block 1104. In the iterative performance of 1105-1119 manager system 110 can be iteratively performing a sequence of blocks including generate block 1117, which can under certain scenarios, result in a certain route being updated.

Referring again to FIG. 6B, manager system 110 for providing a plurality of candidate routes can provide a plurality of candidate routes encompassing the predicted open parking space at location B as well as all passenger vehicle parking spaces 6004 predicted to be open parking spaces within geofence 6014. According to one example, using Eq. 2, manager system 110 at block 1707, can select candidate route 6043 as depicted in FIG. 6B as the selected segment defining (with an additional one or more route segment preceding location B to be traversed in a user passenger vehicle transportation mode) the currently generated selected route.

Referring to the loop of blocks 1105-1119, manager system 110 can iteratively perform generate block 1117 and can iteratively, i.e. when certain conditions apply, updating the current route of a user. For example, FIG. 6C depicts the case where a user has transitioned between location B and location C. At a succession of points between location B and C, manager system 110 can have iteratively reperformed generate block 1117 and, according to one example, may have maintained the current route during each iteration. When a current route is re-selected all route segment defining the route from a current location to the destination location were included in the previous selected route. Referring to location C as depicted in FIG. 6C, it will be seen that a user has now successfully transitioned at breaking point B from a user passenger vehicle transportation mode to a user auxiliary vehicle transportation mode and may be travelling by riding on a personal transportation vehicle of the user, e.g. a motorized scooter or a manually driven bicycle.

Referring again to the flowchart of FIG. 4C, manager system 110 at block 1701 with the user now at location C can determine that a user auxiliary vehicle system of a user is not traveling with a vehicle system of a user (which by examined of location data from vehicle system 120A can be determined to be parked at B) and accordingly can proceed to block 1709. At block 1709, manager system 110 can determine whether a user auxiliary vehicle system is traveling with a user while a vehicle system of the user has stopped, e.g. has parked. In the case that manager system 110 determines that a user auxiliary vehicle system of a user is moving with the vehicle system associated to the user having been stopped (indicating that the user passenger vehicle user has parked at location B) manager system 110 can proceed to block 1710 (auxiliary transportation mode). In an auxiliary transportation mode, a user can be traveling in a user auxiliary vehicle transportation mode or a public vehicle transportation mode.

Referring to blocks 1701 and 1709 manager system 110 can determine a current transportation mode of a user. In the case manager system 110 determines that a user auxiliary vehicle is traveling with a user passenger vehicle (block 1701) thus determining that the user is traveling in a user passenger vehicle transportation mode, evaluation of a current route by manager system 110 can include performing of cell processing as explained in connection with Eq. 1 and FIG. 6B and can also include evaluating of candidate routes having multiple candidate break points at which the user is to transition from a user passenger vehicle transportation mode to a user auxiliary vehicle transportation mode, and selecting one of the candidate routes. In the case on examination path data manager system 110 determines that a user auxiliary vehicle is traveling with a user passenger vehicle stopped (block 1709) thus determining that the user is traveling in a user auxiliary vehicle transportation mode, evaluation of a current route by manager system 110 can include evaluating of candidate routes commencing at the current location of the user, and selecting one of the candidate routes.

Referring to blocks 1701 and 1709 manager system 110 can determine a current transportation mode of a user using path data of a user passenger vehicle and path data of a user auxiliary vehicle as set forth herein. Referring to blocks 1701 and 1709 manager system 110 additionally or alternatively can determine a current transportation mode of a using proximity data that indicates that user passenger vehicle 1200 and user auxiliary vehicle 1210 and/or a client computer device e.g. client computer device 130A are in proximity with one another. For example, each of vehicle system 120A and auxiliary vehicle system 121A and client computer device 130A (FIG. 3) can have incorporated therein a short range radio transceiver such that the transceivers communicate in short range and do not incorporate when not in short range. One or more of vehicle system 120A and auxiliary vehicle system 121A or client computer device 130A can send at blocks 1203, 1213, or 1305 respectively the proximity indicating communication active/inactive status data to manager system 110. Manager system 110 in turn can determine that a user is traveling in a user passenger vehicle system when vehicle system 120A, auxiliary vehicle system 121A, and client computer device 130A are in short range radio transceiver communication range, and can determine that a user is traveling in a user auxiliary vehicle transportation mode when auxiliary vehicle system 121A, and client computer device 130A are in short range radio transceiver communication range, but neither of auxiliary vehicle system 121A, and client computer device 130A are in short range radio transceiver communication range of vehicle system 120A.

Manager system 110 can determine that a user is traveling in a public vehicle transportation mode when a user is completing a current trip having a current route specifying a public vehicle transportation mode route segment, client computer device 130A is not in short range radio transceiver communication range of vehicle system 120A but nonetheless based on examination of path data is travelling in excess of a threshold speed indicative of a maximum speed of the user's auxiliary vehicle. The method depicted with the flowchart of FIG. 4C according to one embodiment can have a third branch (not shown) triggered when manager system 110 determines that a user traveling in a public vehicle transportation mode. Triggering of the branch can trigger functional blocks according to functional blocks 1710, 1711, 1712.

Referring again to block 1710, manager system 110 can provide candidate routes of a user based on a current location of a user, i.e. the location of a user at location C. Exemplary candidate routes of a user starting from location C are depicted in FIG. 6C. The candidate routes of a user starting from location C and terminating at destination location Z can include candidate route 6052, candidate route 6053, and candidate route 6054. At block 1710, manager system 110 can provide a plurality of candidate routes and at block 1711, manager system 110 can score the various candidate routes. The scoring at blocks 1710 can include manager system 110 using Eq. 2 as set forth herein for scoring the various candidate routes in dependence, e.g. on a destination time factor $RF_1$, a comfort factor $RF_2$, a physical exhaustion factor $RF_3$, and a current route factor $RF_4$. With no changes in predicted current traffic conditions or weather conditions, it can be expected that manager system 110, when a user has reached the interim location C, can re-select the current route (where all route segments are shared by the previous selected route). However, in some circumstances and some scenarios, conditions may have changed.

For example, while the user has transitioned from location B to location C, weather conditions or predicted weather conditions might have changed. Also, as the user has transitioned from location B to location C, traffic density conditions and/or predicted traffic density conditions may have changed. In can be seen that by application of Eq. 2 the highlighted change conditions or other change conditions can conceivably change scoring of candidate routes performed by application of Eq. 2, thus changing the selected route segment and thus triggering a change in the selected route so that a new current route is defined. For example, with reference to FIG. 6C, a change in weather conditions to current storm conditions or predicted storm conditions can trigger the assignment of a low comfort value for a user, according to factor $RF_2$ of Eq. 2 to result in selection of candidate route 6054 depicted in FIG. 6C over candidate route 6053. It can be seen that candidate route 6054 which comprises the user traveling on an auxiliary transportation vehicle provided by a public train provides protection from the environment to the user and therefore can be more comfortable to a user when weather conditions change for the worse. In an alternative scenario, the user prior to reach interim location C, might have stopped, e.g. for any arbitrary reason, to change the timing parameters of the current route. Such changed timing parameters might have made candidate route 6054 more attractive based by application of the scoring formula of Eq. 2, based e.g. on reduced wait time at a train terminal (with new timing conditions a terminal wait time might have be reduced thus boosting the factor $RF_1$ value for the route comprising a public vehicle transportation mode).

Referring to the decision data structures of Tables A-D, it has been described that manager system 110 can iteratively update the criterion sets associated with each action decision row of the various decision tables. In another aspect, manager system 110 can iteratively update criterion sets in accordance with biometric data, which is iteratively obtained from a user during an iterative performance by manager system 110 of block 1112, wherein manager system 110 can receive location data from a client computer device 130A associated to a user, including such data as location data and also such data as biometric data of a user. For example, the client computer device of a user e.g. client computer device 130A can in one example be provided by a wrist worn smartwatch which includes one or more biometric sensor such as a pulmonary sensor, which senses, e.g. heart rate and/or blood pressure and which outputs to manager system 110 biometric data in the form of e.g. heart rate data and/or blood pressure data. Manager system 110 on receipt of biometric data at block 1112 can automatically process the biometric data to identify a risk condition associated to the user, e.g. a high blood pressure condition of the user or a high heart rate, e.g. threshold exceeding blood pressure or heart rate condition of a user. Based on the detection of a risk condition by manager system 110, manager system 110 can update a decision data structure such as the decision data structure of Tables A-D so that on the detection of a current risk condition, for example, the weather conditions triggering a relatively high comfort value for a user under factor $RF_2$ of Eq. 2 or factor $F_3$ of Eq. 1 can be rendered more stringent, i.e. more difficult to achieve. For example, prior to a risk condition of a user being detected a predicted weather condition temperature returning a certain high comfort value for a user according to factor of Eq. 1 or Eq. 2, e.g. can change from a temperature range of 60° F. to 90° F. (no risk condition detection) to a smaller range (70° F. to 80° F.) in the case that a risk condition of the user is detected. According to one embodiment, in the case that a risk condition of a user is currently detected, manager system 110 can predict for purposes of safety that the risk condition will be maintained throughout the performance of a route from a current location of a user to a destination location of a user. Manager system 110 accordingly on detecting that a risk condition attaches to a user based on examining of biometric data, can transition a current route of the user to an updated route which includes one or more route segment in which the user travels in a public vehicle transportation mode. For example, in the described scenario the temperature can be 85° F. which normally drives a high comfort score for the user but does not drive a high comfort score for the user when a risk condition of the user is detected can result in selection of a candidate route comprising one or more route segment to be traveled in a public vehicle transportation mode.

According to another example, manager system 110 can be configured so that detection of a risk condition of a user triggers a biasing of criterion set values as described in Table B and Table C so that the physical exhaustion score under factor F4 Eq. 1 and RF3 of Eq. 2 is driven to a second lowest possible value (second high predicted physical exhaustion level) in the case the candidate route has the user riding on an a motorized user auxiliary vehicle, and to a lowest possible value (highest predicted physical exhaustion level) in the case the candidate route has the user riding on an unmotorized user auxiliary vehicle. Under the alternative scenario described, a detection of a risk condition of a user can drive transition of a selected route to a route that includes a public vehicle transportation mode. For safety reasons, manager system 110 on detection of a risk condition of the user can perform evaluations of candidate routes and cells based on the assumption that the risk condition will remain for the duration of a current trip.

Returning to the flowchart of FIGS. 4A-4B, manager system 110 at block 1119 can determine that a user has breached a parking geofence 6064 associated to a destination location Z of the user. Manager system 110 at block 1119 can determine that a user has breached parking geofence by determining that, e.g. client computer device 130A has breached the parking geofence, that user auxiliary vehicle system 121A has breached the geofence (in the case of a user auxiliary vehicle transportation mode), or can determine that vehicle system 120A with user auxiliary vehicle system 121A has breached the parking geofence 6104, e.g. in the case of a user passenger vehicle transportation mode. In response to the determination that a parking geofence has been breached at block 1119, manager system 110 can proceed to a guided parking mode of operation as depicted in blocks 1120-1124.

At block 1120 for example, manager system 110 can query an IoT sensor system 140 which receives the query at block 1403 and sends return data, i.e. as may be provided by IoT data at block 1404. Manager system 110 can receive the response IoT data at block 1121 and can perform processing of the received IoT data at block 1122, the IoT data received at block 1121 can include, e.g. spatial image data from IoT camera sensors disposed to sense occupancy or openness of parking spaces within the parking geofence established about destination location Z. The frame rate can be increased with respect to the frame rate associated to IoT data received at block 1115 and the higher frame rate IoT data can be selectively generated only within parking geofence 6064 generated about destination location Z.

At block 1123, manager system 110 can send prompting data to, e.g. vehicle system 120A, user auxiliary vehicle system 121A, and client computer device 130A for receipt respectively by vehicle system 120A, user auxiliary vehicle system 121A, and client computer device 130A at respective blocks 1205, 1215, and 1307. Manager system 110 can send, at block 1123, prompting data that prompts a user to travel to a detected open parking space within the geofence detected by performance of the processing at block 1122.

At block 1124, manager system 110 can determine whether the user has stopped at the destination location Z. Manager system 110 can determine at block 1124 that the user has stopped at the destination location Z, when the user has parked the user's user passenger vehicle and/or user auxiliary vehicle in a detected open parking spot detected at block 1122. In the case that a user has been determined not to be stopped at block 1124, manager system 110 can return to block 1119 and can iteratively return the loop of blocks 1119-1124 until a user has parked a user passenger vehicle of the user and/or a user auxiliary vehicle of the user at an identified open parking space identified at block 1122. According to one embodiment, with the receipt of IoT data received at block 1121, manager system 110 can be iteratively receiving from vehicle system 120A, user auxiliary vehicle system 121A, and client computer device 130A updated location data specifying current location of vehicle system 120A, user auxiliary vehicle system 121A, and client computer device 130A. Manager system 110 can determine that a user has stopped at an open parking space at block 1124 by examining one or more of vehicle system location data, current user auxiliary vehicle system location data, and/or current client computer device location data. All of which can be received iteratively at block 1121. Manager system 110 on completion of block 1124 can proceed to block 1125 to perform machine learning training.

At block 1125, manager system 110 can apply training data for training of predictive models 7002 and 7004 as described in connection with FIGS. 7A and 7B, based on historical route data, historical weather condition data, and historic traffic condition data associated to a trip and route just completed at block 1124. Such machine learning training performed by manager system 110 can include multiple queries of data repository 108 which can store the predictive models 7002 and 7004 and predictive models 7002 and 7004 once retrained with updated training data can be updated within data repository 108 as indicated by query receive respond and update block 1087 performed by data repository 108. On completion of block 1125, manager system 110 can proceed to block 1126 at which manager system 110 can return to block 1104 where manager system 110 can wait for route request data. Manager system 110 can be executing multiple instances of block 1104 and succeeding blocks concurrently.

At block 1104, manager system 110 can wait for receipt of additional route request data from the user of client computer device 130A-130Z. Manager system 110 can be iteratively performing multiple instances of the loop of blocks 1104-1105 for multiple users of system 100 who have associated respective different client computer devices 130A-130Z who may have defined and submitted route request data concurrently.

Various available tools, libraries, and/or services can be utilized for implementation of predictive model 7002 and predictive model 7004. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Training predictive model 7002 and predictive model 7004 can include use of e.g. support vector machines (SVM), Bayesian networks, neural networks and/or other machine learning technologies.

Certain embodiments herein may offer various technical computing advantages involving computing advantages to address problems arising particularly in the realm of computer networks and computer systems configured to provide location based services (LBS). Embodiments herein can employ predictive analytics which use Artificial Intelligence (AI) platforms. Embodiments herein can evaluate predicted performance of a user traveling in a user passenger vehicle transportation mode through a geospatial region as compared to predicted performance of a user traveling through a geospatial region in a user auxiliary vehicle transportation mode, in which the user can be traveling on a personal vehicle of the user. A computer system can be employed to perform the described evaluating on an iterative basis so that returned action decision can change in dependence on changing sense conditions. Sense conditions that can trigger changes can include e.g. weather condition chains and/or traffic condition changes. Embodiments herein can include a computer system transitioning can trigger the transition of a current route to be designated perform performance by a user traveling in a single mode transportation route into multimode mode transportation mode in which the user travels on a trip from a starting location to a destination location partially in a user passenger vehicle transportation mode and partially in a user auxiliary vehicle transportation mode. Embodiments herein can facilitate a user arriving at a destination e.g. more quickly and with greater comfort. Embodiments herein can base route planning on a predicted comfort level of a user. The user's predicted comfort level can dynamically change throughout the course of the trip in dependence, e.g., on changing weather conditions and/or changing biometric conditions of the user. Embodiments herein can sense biometric risk condition of the user and can dynamically change criterion for determination of the sense of a predicted comfort level of the user. Embodiments herein can include use of predictive models that are trained by machine learning to predict e.g. a average speed of a user passenger vehicle or user auxiliary vehicle through a geospatial region or along a route segment. Embodiments herein can include dynamically adding to a data repository area that stores data on trail segments that are determined to be traversable by user traveling on a user auxiliary vehicle such as a personal vehicle. Embodiments herein can perform route planning in dependence on predicted physical exhaustion levels of a user during performance of the route and decision data structures can be employed e.g. for return of action decisions in respect to a predicted users physical exhaustion level, which predicted levels can be dependent on vehicle types used for travel by the user.

Figure 8:
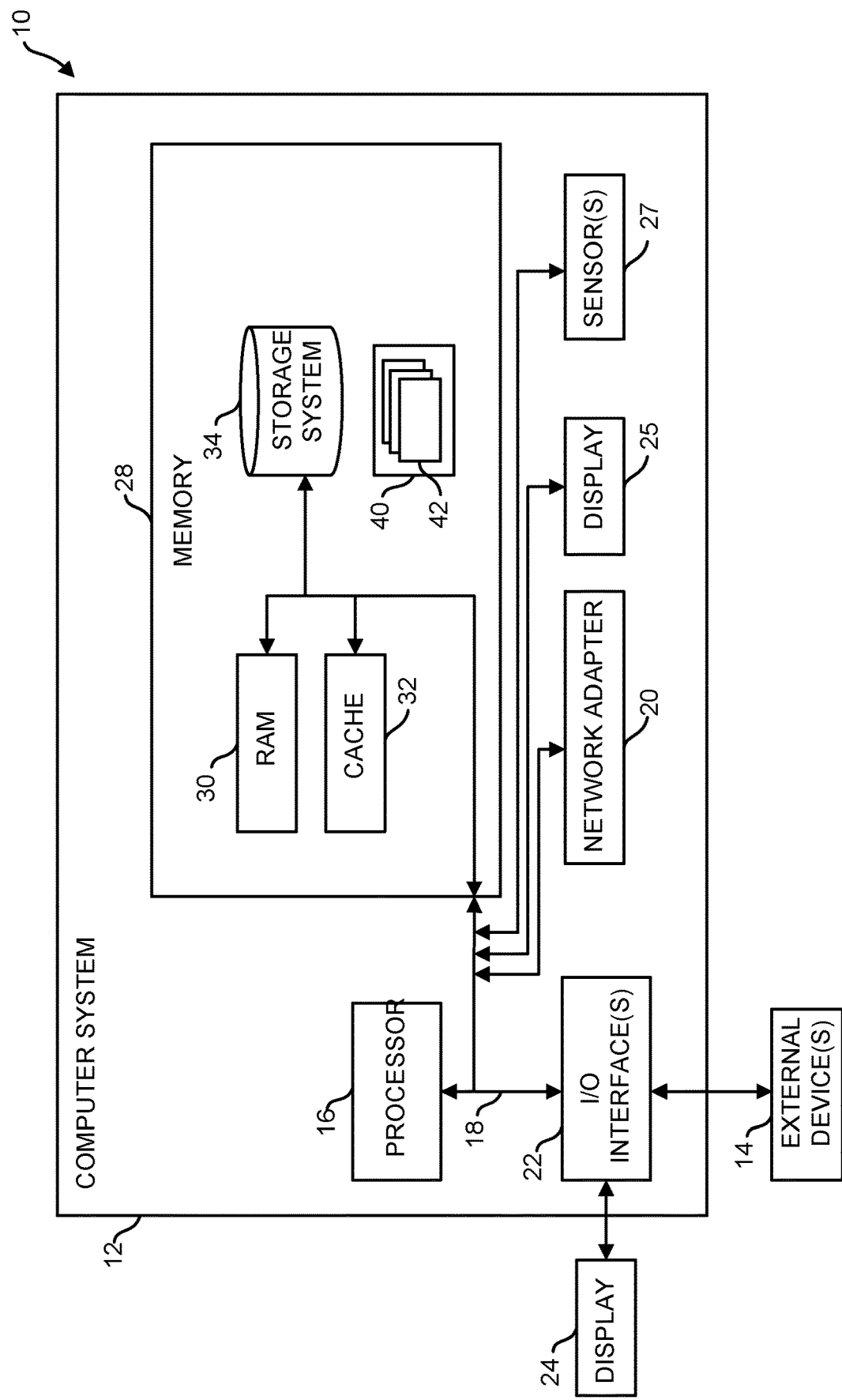
FIG. 8 depicts a computing node according to one embodiment.
Figure 9:
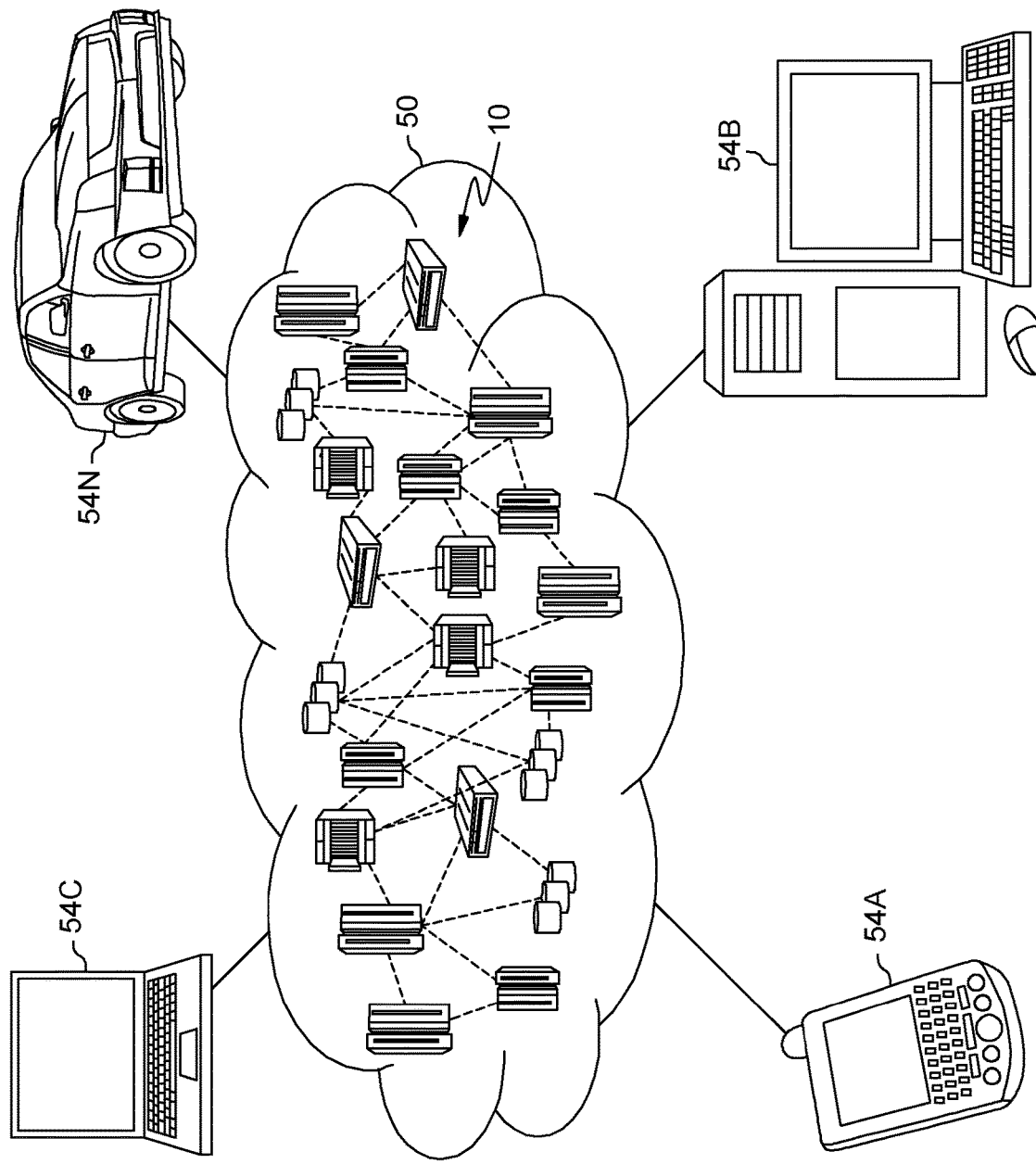
FIG. 9 depicts a cloud computing environment according to one embodiment.
Figure 10:
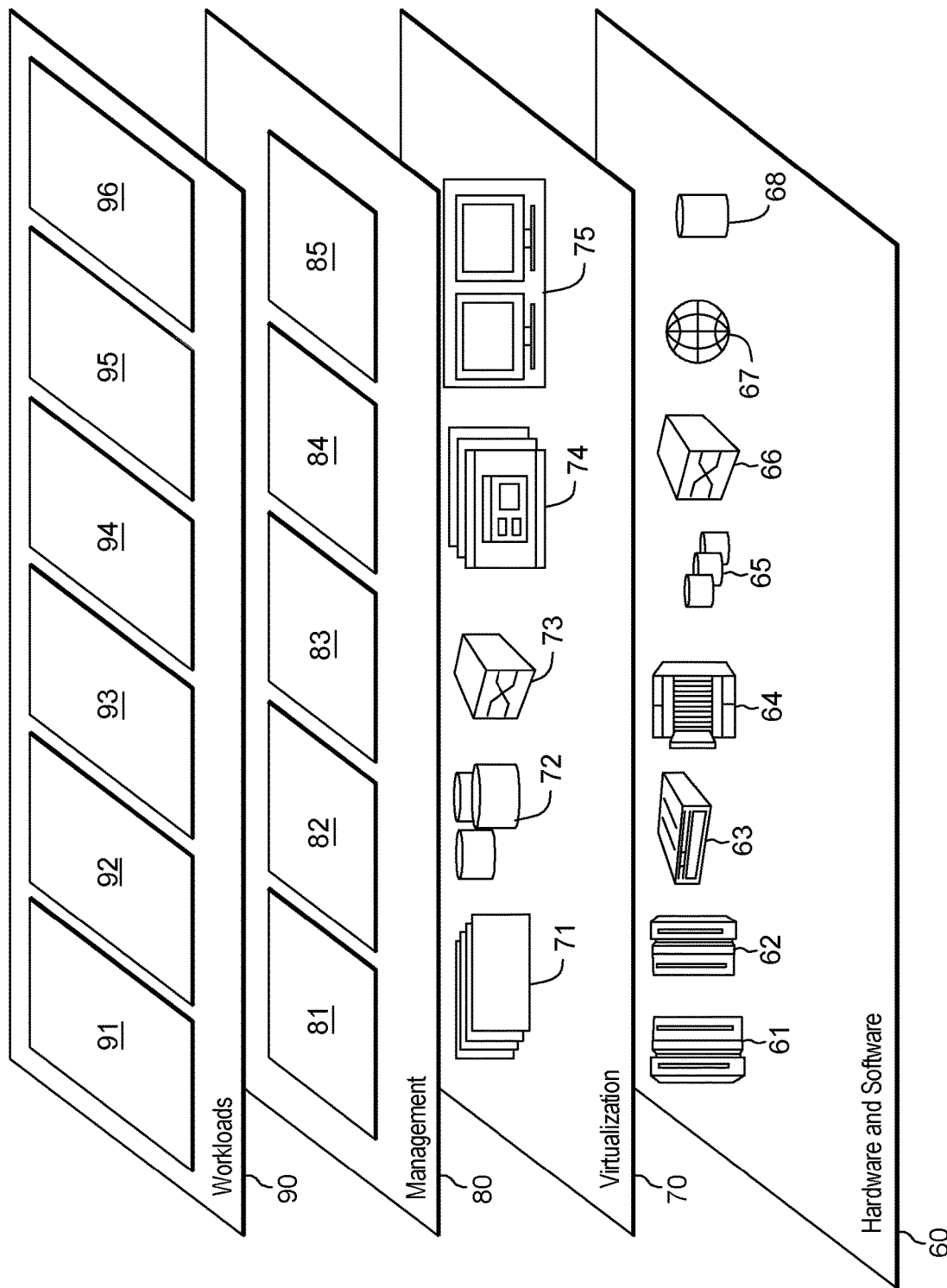
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2 and functions described with reference to manager system 110 as set forth in the flowchart of FIGS. 4A and 4B, and the flowchart of FIG. 4C. In one embodiment, vehicle system 120A can include one or more computing node 10 and can include one or more program 40 for performing functions described with reference to vehicle system 120A as set forth in the flowchart of FIGS. 4A and 4B. In one embodiment, auxiliary vehicle system 121A can include one or more computing node 10 and can include one or more program 40 for performing functions described with reference to vehicle system 121A as set forth in the flowchart of FIGS. 4A and 4B. In one embodiment, client computer device 130A can include one or more computing node 10 and can include one or more program 40 for performing functions described with reference to client computer device 130A as set forth in the flowchart of FIGS. 4A and 4B. In one embodiment, systems 140, 150, 160, 170, 172, 180 can include one or more computing node 10 and can include one or more program 40 for performing functions described with reference to systems 140, 150, 160, 170, 172, 180 as set forth in the flowchart of FIGS. 4A and 4B. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for generating routes as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have"

(and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A computer implemented method comprising:
   determining a current transportation mode of a user with use of data of a user passenger vehicle associated to the user and data of a user auxiliary passenger vehicle associated to the user, wherein the user passenger vehicle is capable of carrying the user auxiliary vehicle, and wherein the user auxiliary vehicle is configured to be hand carried by the user;
   evaluating a current route of the user in dependence on the current transportation mode of the user as determined by the determining; and
   providing one or more output in dependence on the evaluating, wherein the method includes iteratively performing the determining and the evaluating, wherein:
      the evaluating during a first earlier instance of the evaluating includes updating the current route of the user as a single mode user passenger vehicle transportation route, and wherein
      the evaluating during a second later instance of the evaluating includes updating of the current route of the user as a multimode transportation route in which the user travels partially in a user passenger vehicle transportation mode and partially in a user auxiliary vehicle transportation mode,
      wherein the iteration includes (i) evaluating candidate routes commencing from a current location of the user, and (ii) selecting one of the candidate routes from (i), wherein the evaluating of candidate routes (i) includes applying a criteria having one or more factor selected from the group consisting of $RF_1$, $RF_2$, $RF_3$, and $RF_4$, where $RF_1$ is a predicted destination arrival time associated with each respective candidate route of the candidate routes, where $RF_2$ is a predicted comfort level associated with each respective route of the candidate routes, in dependence on a predicted comfort level of the user when travelling according to the respective candidate route, where $RF_3$ is a predicted physical exhaustion factor associated to the route in dependence on a predicted physical exhaustion level of the user when travelling according to the candidate route, and where $RF_4$ is a current route factor which biases the selection of candidate routes in favor of re-selecting a current route.

2. A computer implemented method comprising:
   determining a current transportation mode of a user with use of data of a user passenger vehicle associated to the user and data of a user auxiliary passenger vehicle associated to the user, wherein the user passenger vehicle is capable of carrying the user auxiliary vehicle, and wherein the user auxiliary vehicle is configured to be hand carried by the user;
   evaluating a current route of the user in dependence on the current transportation mode of the user as determined by the determining; and
   providing one or more output in dependence on the evaluating,
      wherein the determining a current transportation mode of a user includes determining that the user is currently traveling in a user passenger vehicle transportation mode,
      wherein the evaluating a current route includes evaluating a predicted performance of the user passenger vehicle through a geospatial region associated to a destination of the user in comparison to a predicted performance of the user auxiliary vehicle through the geospatial region associated to the destination of the user, and
      wherein the method includes for predicting performance of the user passenger vehicle and the user auxiliary vehicle through the geospatial region include using a criteria for ascertaining predicted performance of the user passenger vehicle and a user auxiliary vehicle, respectively, through the geospatial region, wherein the criteria includes one or more factor selected from the group consisting of $F_1$, $F_2$, $F_3$, $F_4$, and $F_5$, wherein $F_1$ is an average speed factor in dependence on predicted average vehicle speed through the geospatial region, $F_2$ is a parking factor in dependence on predicted availability of vehicle parking within the geospatial region, $F_3$ is a comfort factor in dependence on predicted user comfort through the geospatial region, $F_4$ is a physical exhaustion factor in dependence on predicted level of physical exhaustion of the user through the geospatial region, and $F_5$ is a current route factor which biases the selection of candidate routes in favor of re-selecting a current route.

3. The computer implemented method of claim 2, wherein the method includes determining that a predicted performance of the user auxiliary vehicle through the geospatial region exceeds the predicted performance of the user passenger vehicle through the geospatial region and based on the determining, generating a multimode transportation route in which the user will travel to the destination partially in a user passenger vehicle transportation mode and partially in a user auxiliary vehicle transportation mode.

4. The computer implemented method of claim 2, wherein the method includes iteratively performing the determining and the evaluating, wherein the determining during a first earlier iteration includes determining that the user passenger vehicle of the user and the auxiliary vehicle are traveling together, and wherein the evaluating during the first earlier iteration includes (a) performing geospatial region processing to compare predicted performance of the user passenger vehicle to predicted performance of the use auxiliary vehicle through a geospatial region encompassing a destination of a current trip of a user, (b) evaluating candidate routes having multiple different candidate break points at which the user is to transition from a user passenger vehicle transportation mode to a user auxiliary vehicle transportation mode, and (c) selecting one of the candidate routes from (b), wherein the evaluating during a second later iteration includes (i) evaluating candidate routes commencing from a current location of the user, and (ii) selecting one of the candidate routes from (i).

5. The computer implemented method of claim 2, wherein the method for predicting performance of the user passenger vehicle and the user auxiliary vehicle through the geospatial region includes using the formula $S=F_1W_1+F_2W_2+F_3W_3+F_4W_4+F_5W_5$, for scoring predicted performance of the user passenger vehicle and a user auxiliary vehicle, respectively, through the geospatial region, and where $W_1$-$W_5$ are weights associated to the various factors.

6. The computer implemented method of claim 2, wherein the method includes iteratively performing the determining and the evaluating, wherein the determining during a first earlier iteration includes determining that the user passenger vehicle of the user and the auxiliary vehicle are traveling together, and wherein the evaluating during the first earlier iteration includes (a) performing geospatial region processing to compare predicted performance of the user passenger vehicle to predicted performance of the use auxiliary vehicle through a geospatial region encompassing a destination of a current trip of a user, (b) evaluating candidate routes having multiple different candidate break points at which the user is to transition from a user passenger vehicle transportation mode to a user auxiliary vehicle transportation mode and (c) selecting one of the candidate routes from (b), wherein the evaluating during a second later iteration includes (i) evaluating candidate routes commencing from a current location of the user, and (ii) selecting one of the candidate routes from (i), wherein the evaluating of candidate routes of (i) includes using the formula $P=RF_1W_1+RF_2W_2+RF_3W_3+RF_4W_4$, where P is a predicted performance score for a candidate route being evaluated, where $RF_1$ is a predicted destination arrival time associated to the candidate route, where $RF_2$ is a predicted comfort level associated to the route in dependence on a predicted comfort level of the user when travelling according to the candidate route, where $RF_3$ is a predicted physical exhaustion factor associated to the route in dependence on a predicted physical exhaustion level of the user when travelling according to the candidate route, and where $RF_4$ is a current route factor which biases the selection of candidate routes in favor of re-selecting a current route.

7. The computer implemented method of claim 2, wherein the method includes receiving route data from the user that specifies a current trip having a destination, and wherein the current route is for the current trip, wherein the method includes iteratively performing the determining and the evaluating to iteratively update the current route for the current trip, wherein the method includes dynamically updating the current route for the current trip from a first route to a second route, wherein the first route is a single transportation mode route in which the user is designated to travel to the destination in a user passenger vehicle transportation mode, wherein the second route is a multimode transporting route in which the user is designated to travel to the destination partially in a user passenger vehicle transportation mode and partially in a user auxiliary vehicle transportation mode.

8. The computer implemented method of claim 2, wherein the method includes receiving route data from the user that specifies a current trip having a destination, wherein the current route is for the current trip, wherein the method includes iteratively performing the determining and the evaluating to iteratively update the current route for the current trip, wherein the method includes dynamically updating the current route for the current trip from a first route to a second route, wherein the first route is a single transportation mode route in which the user is designated to travel to the destination in a user passenger vehicle transportation mode, wherein the second route is a multimode transporting route in which the user is designated to travel to the destination partially in a user passenger vehicle transportation mode and partially in a user auxiliary vehicle transportation mode, wherein the method includes in response to the dynamically updating the current route to the first route, sending to the user prompting data, the prompting data including text based data describing to the user actions by the user for performance of the first route, wherein the method includes in response to the dynamically updating the current route from the first route to the second route, sending second prompting data to the user, the second prompting data including text based data describing to the user actions by the user for performance of the second route.

9. The computer implemented method of claim 2, wherein the method includes receiving route data from the user that specifies a current trip having a destination, wherein the current route is for the current trip, wherein the method includes iteratively performing the determining and the evaluating to iteratively update the current route for the current trip, wherein the method includes dynamically updating the current route for the current trip from a first route to a second route, wherein the first route is a single transportation mode route in which the user is designated to travel to the destination in a user passenger vehicle transportation mode, wherein the second route is a multimode transporting route in which the user is designated to travel to the destination partially in a user passenger vehicle transportation mode and partially in a user auxiliary vehicle transportation mode, wherein the method includes in response to dynamically updating the current route to the first route, sending to the user prompting data, the prompting data including text based data describing to the user actions by the user for performance of the first route, wherein the method includes in response to the dynamically updating the current route from the first route to the second route, sending second prompting data to the user, the second prompting data including text based data describing to the user actions by the user for performance of the second route, wherein the text based data describing to the user actions by the user for performance of the second route includes text base data prompting the user to disembark the user passenger vehicle at a specified location, and to commence travel by riding on the user auxiliary vehicle at the specified location.

10. The computer implemented method of claim 2, wherein the method includes iteratively performing the determining and the evaluating, and wherein method includes updating, with performance of an iteration of the evaluating, a current route from a first route which includes user auxiliary vehicle transportation mode and is absent of a second transportation mode to a second route which includes the second transportation mode, in response to examination of biometric data received from a device worn by the user.

11. The computer implemented method of claim 2, wherein the method includes iteratively performing the determining and the evaluating, wherein the determining during at least one iteration includes (i) evaluating candidate routes commencing from a current location of the user, and (ii) selecting one of the candidate routes from (i), wherein the evaluating of candidate routes of (i) includes applying a criteria having one or more factors selected from the group consisting of $RF_1$, $RF_2$, $RF_3$, and $RF_4$, where $RF_1$ is a predicted destination arrival time associated to the candidate route, where $RF_2$ is a predicted comfort level associated to the route in dependence on a predicted comfort level of the user when travelling according to the candidate route, where $RF_3$ is a predicted physical exhaustion factor associated to the route in dependence on a predicted physical exhaustion level of the user when travelling according to the candidate route, and where $RF_4$ is a current route factor which biases the selection of candidate routes in favor of re-selecting a current route.

12. The computer implemented method of claim 2, wherein the method includes iteratively performing the determining and the evaluating.

13. The computer implemented method of claim 2, wherein the method includes iteratively performing the determining and the evaluating, and wherein method includes iteratively updating the current route of the user in dependence on the iteratively performing the determining and the evaluating.

14. The computer implemented method of claim 2, wherein the method includes iteratively performing the determining and the evaluating, wherein the iteratively evaluating includes, for respective instances of the evaluating, comparing predicted performances of multiple candidate routes including the current route, and wherein the method further includes iteratively updating the current route of the user based on the predicted performance evaluation.

15. The computer implemented method of claim 2, wherein the method includes iteratively performing the determining and the evaluating, and wherein the method includes transitioning the current route from a first route provided by a multimode transportation route to a second route provided by a single mode transportation mode in which the user travels in a user auxiliary vehicle transportation mode, wherein iterations of the evaluating prior to the transitioning are characterized by evaluating multiple candidate routes based on the multimode transportation mode, and wherein iterations of the evaluating subsequent to the transitioning are characterized by evaluating multiple candidate routes based on the single mode transportation mode.

16. The computer implemented method of claim 2, wherein the method includes iteratively performing the determining and the evaluating, and wherein the method includes transitioning the current route from a first route provided by a multimode transportation route to a second route provided by a single mode transportation mode in which the user travels in an auxiliary vehicle mode of transportation, wherein iterations of the evaluating during a first period of time that occurs before the transitioning are characterized by evaluating multiple candidate routes selected by a first process, and wherein iterations of the evaluating during a second period of time that occurs after the transitioning are characterized by evaluating multiple candidate routes selected by a second process, wherein the first process is active during the first period of time in response to iterations of the determining resulting in a determination that the user is traveling in the user passenger vehicle transportation modes, and wherein the second process is active during the second period of time in response to iterations of the determining resulting in a determination that the user is traveling in a user auxiliary vehicle transportation mode.

17. A computer implemented method, comprising:
determining a current transportation mode of a user with use of data of a user passenger vehicle associated to the user and data of a user auxiliary passenger vehicle associated to the user, wherein the user passenger vehicle is capable of carrying the user auxiliary vehicle, and wherein the user auxiliary vehicle is configured to be hand carried by the user;
evaluating a current route of the user in dependence on the current transportation mode of the user as determined by the determining; and
providing one or more output in dependence on the evaluating,
wherein the evaluating a current route includes evaluating a predicted performance of the user passenger vehicle through a geospatial region associated to a destination of the user in comparison to a predicted performance of the user auxiliary vehicle through the geospatial region associated to the destination of the user, and wherein the method includes for predicting performance of the user passenger vehicle and the user auxiliary vehicle through the geospatial region include using a criteria for ascertaining predicted performance of the user passenger vehicle and a user auxiliary vehicle, respectively, through the geospatial region, wherein the criteria includes one or more factor selected from the group consisting of $F_1$, $F_2$, $F_3$, $F_4$, and $F_5$, wherein $F_1$ is an average speed factor in dependence on predicted average vehicle speed through the geospatial region, $F_2$ is a parking factor in dependence on predicted availability of vehicle parking within the geospatial region, $F_3$ is a comfort factor in dependence on predicted user comfort through the geospatial region, $F_4$ is a physical exhaustion factor in dependence on predicted level of physical exhaustion of the user through the geospatial region, and $F_5$ is a current route factor which biases the selection of candidate routes in favor of re-selecting a current route.

* * * * *